US012699341B2

(12) United States Patent
Shoji et al.

(10) Patent No.: US 12,699,341 B2
(45) Date of Patent: Aug. 4, 2026

(54) HEATING DEVICE WITH ASYMMETRICALLY CONFIGURED THERMAL CONDUCTOR, FIXING DEVICE, AND IMAGE FORMING APPARATUS

(71) Applicants: Keitaro Shoji, Kanagawa (JP); Yasunori Ishigaya, Kanagawa (JP)

(72) Inventors: Keitaro Shoji, Kanagawa (JP); Yasunori Ishigaya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 18/903,334

(22) Filed: Oct. 1, 2024

(65) Prior Publication Data

US 2025/0110433 A1 Apr. 3, 2025

(30) Foreign Application Priority Data

Oct. 2, 2023 (JP) ................................ 2023-171263

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
None
See application file for complete search history.

(56) References Cited

U.S. PATENT DOCUMENTS

2015/0055993 A1 2/2015 Shoji
2015/0125193 A1 5/2015 Ishii et al.
2015/0261157 A1 9/2015 Yamano et al.
2023/0010218 A1 1/2023 Shoji et al.
2023/0205118 A1 6/2023 Yasunori et al.
2023/0266699 A1 8/2023 Shoji et al.
2023/0288850 A1 9/2023 Shoji et al.
2023/0367252 A1 11/2023 Matsumoto et al.
2023/0384719 A1 11/2023 Matsumoto et al.

FOREIGN PATENT DOCUMENTS

JP 2012-198475 A 10/2012
JP 2015-038550 A 2/2015
JP 2015-176085 A 10/2015
JP 2022-089694 A 6/2022

*Primary Examiner* — Arlene Heredia Ocasio
(74) *Attorney, Agent, or Firm* — XSENSUS LLP

(57) ABSTRACT

A heating device includes a rotator, a heater including a base and a heat generator that forms a heat generation region, and a thermal conductor. The base, the heat generation region, the thermal conductor, and a maximum sheet passing region shorter than the heat generation region each extend from one end to another end in the longitudinal direction. A protrusion amount between the heat generation region and the base regarding the one end is shorter than that between them regarding another end. The following expressions are satisfied.

$$L1R \leq L2R \leq L1R + 1\ (\text{mm}) \quad (1)$$

$$0 \leq (L2R - L1R) \leq (L2L - L1L)\ (\text{mm}) \quad (2)$$

where L1 means the protrusion amount between the maximum sheet passing region and the heat generation region, L2 means the protrusion amount between the maximum passing region and the thermal conductor, and R means the amount regarding another end.

14 Claims, 19 Drawing Sheets

HEATING DEVICE WITH ASYMMETRICALLY CONFIGURED THERMAL CONDUCTOR, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-171263, filed on Oct. 2, 2023, in the Japan Patent Office, the entire disclosure of which is hereby incorporated by reference herein.

BACKGROUND

Technical Field

Embodiments of the present disclosure relate to a heating device, a fixing device, and an image forming apparatus.

Related Art

One type of fixing device that is a heating device includes a fixing belt as a rotator, a planar heater disposed inside the loop of the fixing belt to heat the fixing belt, and a pressure roller as a pressure rotator. A recording medium is heated and pressed between the fixing belt and the pressure roller.

SUMMARY

This specification describes an improved heating device that includes a rotator, a heater, and a thermal conductor. The heater extends in a longitudinal direction to heat the rotator. The heater includes a base and a resistive heat generator. The base extends from one end to another end in the longitudinal direction. The resistive heat generator on the base forms a main heat generation region extending from one end to another end in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. The base has a first base portion and a second base portion. The first base portion protrudes from the one end of the main heat generation region to the one end of the base by a first protrusion amount (L5L). The second base portion protrudes from said another end of the main heat generation region to said another end of the base by a second protrusion amount larger than the first protrusion amount of the first base portion. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

$$0 \leq L3R < L3L \quad (2)$$

where

L1R (mm) is the fourth protrusion amount,

L2R is the sixth protrusion amount, $$L3R = L2R - L1R,$$

$$L3L = L2L - L1L,$$

L1L is the third protrusion amount, and

L2L is the fifth protrusion amount.

This specification also describes a fixing device and an image forming apparatus that include the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
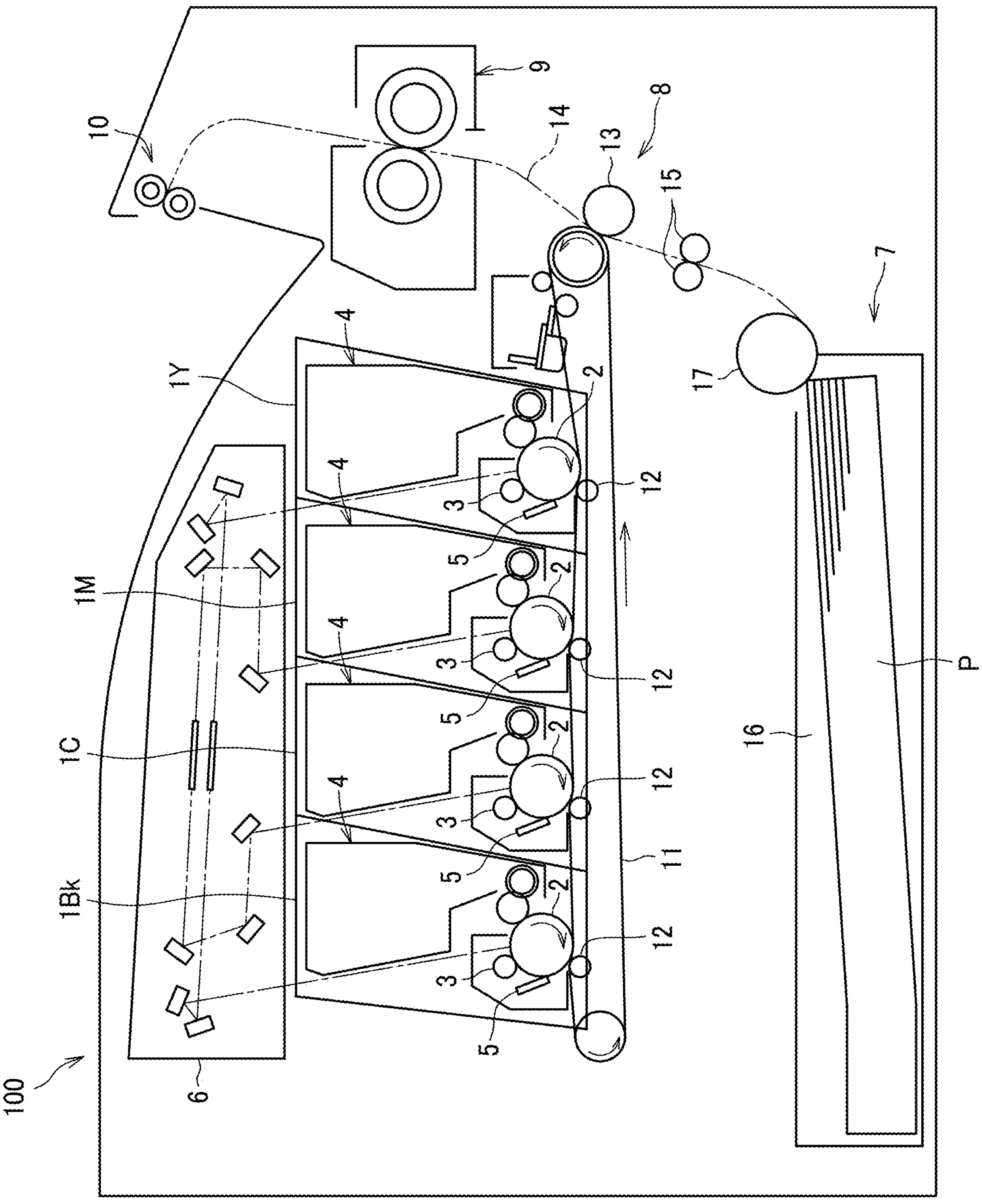
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Referring to the drawings, embodiments of the present disclosure are described below. Like reference signs are assigned to identical or equivalent components and a description of those components may be simplified or omitted. As one example of a heating device, the following describes a fixing device to fix an image onto a recording medium.

FIG. 1 is a schematic diagram of a configuration of an image forming apparatus.

An image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7 as a recording medium feeder, a transfer device 8, a fixing device 9 as the heating device, and a sheet ejection device 10. The exposure device 6 exposes the surface of the photoconductor 2 to form an electrostatic latent image on the surface of the photoconductor 2. The sheet feeder 7 includes a sheet tray 16 and a sheet feed roller 17. The sheet feeder 7 supplies a sheet P as a recording medium to a sheet conveyance path 14 as a recording medium path. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, the transfer device 8, and other devices to form the toner image configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched around a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2.

The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed in the sheet conveyance path 14 at a position between the sheet feeder 7 and the secondary transfer nip defined by the secondary transfer roller 13. Pairs of rollers including the timing roller pair 15 disposed in the sheet conveyance path 14 are conveyance members to convey the sheet P in the sheet conveyance path 14.

Referring to FIG. 1, a description is given of printing operations performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. The exposure device 6 exposes the surface of each photoconductor 2 based on image data of the document read by a document reading device or print data instructed to be printed from a terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with the rotation of each of the photoconductors 2. The toner images are sequentially transferred and superimposed onto the intermediate transfer belt 11 that is driven to rotate counterclockwise in FIG. 1 to form a full color toner image. The full color toner image formed on the intermediate transfer belt 11 is conveyed to the secondary transfer nip defined by the secondary transfer roller 13 in accordance with the rotation of the intermediate transfer belt 11. The full color toner image is transferred onto the sheet P conveyed to the secondary transfer nip.

The sheet P is supplied and fed from the sheet tray 16. The timing roller pair 15 temporarily halts the sheet P supplied from the sheet feeding device 7. Then, the timing roller pair 15 conveys the sheet P to the secondary transfer nip at a time when the full color toner image formed on the intermediate transfer belt 11 reaches the secondary transfer nip. Thus, the full-color toner image is transferred onto and borne on the sheet P. After the toner image is transferred from each of the photoconductors 2 onto the intermediate transfer belt 11, each of cleaning devices 5 removes residual toner on each of the photoconductors 2.

After the full color toner image is transferred onto the sheet P, the sheet P is conveyed to the fixing device 9 to fix the full color toner image onto the sheet P. Then, the sheet ejection device 10 ejects the sheet P onto the outside of the image forming apparatus 100, thus finishing a series of printing operations.

Figure 2:
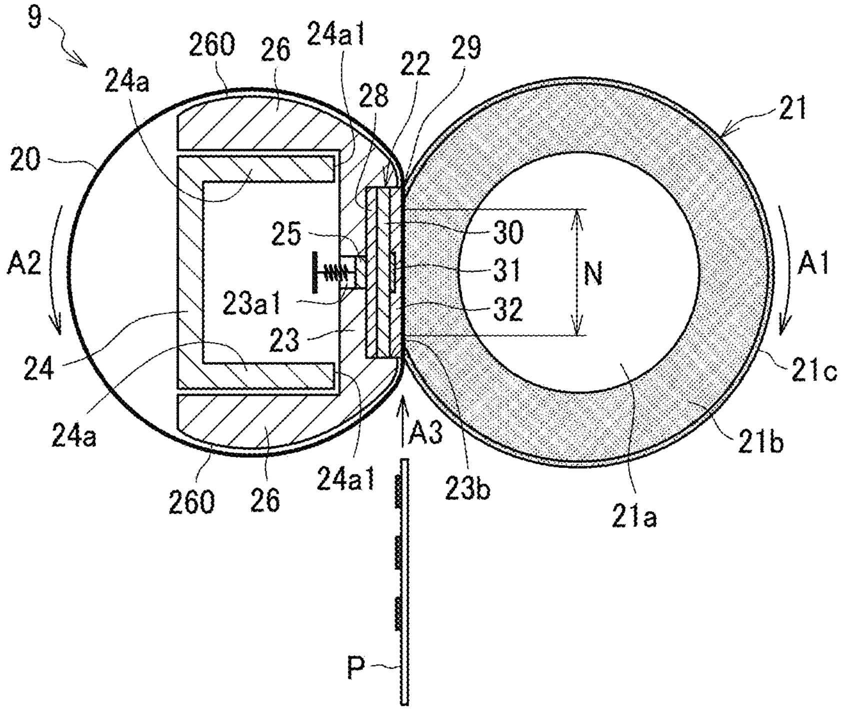
FIG. 2 is a schematic cross-sectional side view of a fixing device.

Subsequently, the configuration of the fixing device is described with reference to FIG. 2. FIG. 2 is a schematic cross-sectional side view of the fixing device 9.

As illustrated in FIG. 2, the fixing device 9 includes a fixing belt 20, a pressure roller 21 as a pressure rotator, a heater 22 as a heating member, a heater holder 23 as a holder, a stay 24 as a support, a thermistor 25 as a temperature detector, a first thermal equalization plate 28 as a high thermal conductor, and a thermostat. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 contacts the back face of a base 30 to detect the temperature of the base 30. A fixing rotator disposed in the fixing device is an aspect of the rotator disposed in the heating device. The fixing device 9 includes the fixing belt 20 as an example of the rotator.

The fixing belt 20, the pressure roller 21, the heater 22, the heater holder 23, the stay 24, the first thermal equalization plate 28, the separation plate 9, and the fixing device 9 extend in a direction perpendicular to the sheet surface of FIG. 2. The direction is referred to simply as a longitudinal direction below. The longitudinal direction is also a width direction of the sheet P to be conveyed, a belt width direction of the fixing belt 20, and an axial direction of the pressure roller 21.

The width direction of the sheet is orthogonal to a sheet conveyance direction and a thickness direction.

The fixing belt 20 includes a base layer configured by, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance durability of the fixing belt 20 and facilitate separation of the sheet P and a foreign substance from the fixing belt 20. An elastic layer made of rubber having a thickness of from 50 to 500 μm may be interposed between the base layer and the release layer. The fixing belt 20 of the present embodiment may be a rubberless belt with no elastic layer. The base layer of the fixing belt 20 may be made of heat resistant resin such as polyetheretherketone (PEEK) or metal such as nickel (Ni) or steel use stainless (SUS), instead of PI. The inner circumferential surface of the fixing belt 20 may be coated with PI or PTFE as a slide layer.

The pressure roller 21 having, for example, an outer diameter of 25 mm, includes a solid iron core 21*a*, an elastic layer 21*b* formed on the surface of the core 21*a*, and a release layer 21*c* formed on the outside of the elastic layer 21*b*. The elastic layer 21*b* is made of silicone rubber and has a thickness of 3.5 mm, for example. The release layer 21*c* is a conductive layer made of perfluoroalkoxy alkane (PFA) with a conductive filler such as carbon.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by the arrow A1 in FIG. 2, and the rotation of the pressure roller 21 rotates the fixing belt 20 in a direction indicated by the arrow A2 in FIG. 2. In other words, the direction indicated by the arrow A1 is a rotation direction of the pressure roller 21 during the image forming operations and a fixing operation, and the direction indicated by the arrow A2 is a rotation direction of the fixing belt 20 during the image forming operations and the fixing operation.

The heater 22 is disposed to contact the inner circumferential surface of the fixing belt 20. The heater 22 contacts the pressure roller 21 via the fixing belt 20 and serves as a nip formation pad to form the fixing nip N between the pressure roller 21 and the fixing belt 20. The fixing belt 20 is a heated member heated by the heater 22. In other words, the heater 22 heats the sheet P that passes through the fixing nip N via the fixing belt 20.

The heater 22 is a planar heater extending in the longitudinal direction of the heater parallel to the width direction of the fixing belt 20. The heater 22 includes a base 30 having a planar shape, resistive heat generators 31 disposed on the base 30, and an insulation layer 32 covering the resistive heat generators 31. The insulation layer 32 of the heater 22 contacts the inner circumferential surface of the fixing belt 20, and the heat generated by the resistive heat generators 31 is transmitted to the fixing belt 20 through the insulation layer 32. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside the loop of the fixing belt 20. The stay 24 is configured by a channeled metallic member, and both side plates of the fixing device 9 support both end portions of the stay 24 in the longitudinal direction of the stay 24. Since the stay 24 supports the heater holder 23 and the heater 22, the heater 22 reliably receives a pressing force of the pressure roller 21 pressed against the fixing belt 20. Thus, the fixing nip Nis stably formed between the fixing belt 20 and the pressure roller 21. In the present embodiment, the thermal conductivity of the heater holder 23 is set to be smaller than the thermal conductivity of the base 30.

Since the heater holder 23 is heated to a high temperature by heat from the heater 22, the heater holder 23 is preferably made of a heat-resistant material. The heater holder 23 made of heat-resistant resin having low thermal conduction, such as a liquid crystal polymer (LCP) or PEEK, reduces heat transfer from the heater 22 to the heater holder 23. Thus, the heater 22 can effectively heat the fixing belt 20.

The heater holder 23 has a holding recess 23*b* to hold the heater 22.

As illustrated in FIG. 2, the heater holder 23 includes guide ribs 26 to guide the fixing belt 20. The heater holder 23 and the guide ribs 26 may be formed as a single unit. The guide ribs 26 are disposed both upstream and downstream from the heater holder 23 in the sheet conveyance direction, along the longitudinal direction.

Each of the guide ribs 26 has a substantially fan shape. Each of the guide ribs 26 has a guide face 260 that is an arc-shaped or convex curved face extending in a belt circumferential direction along the inner circumferential face of the fixing belt 20.

The heater holder 23 has a detection through hole 23*a*1 penetrating the heater holder 23 in the thickness direction of the heater holder 23. The thermistor 25 is in the detection through hole 23*a*1.

The first thermal equalization plate 28 as a thermal conductor is made of a material having a higher thermal conductivity than the thermal conductivity of the base 30. In the present embodiment, the first thermal equalization plate 28 is made of aluminum and has a thickness of 0.3 mm. Alternatively, the first thermal equalization plate 28 may be made of copper, silver, graphene, or graphite, for example. Forming the first thermal equalization plate 28 to have the planar shape can enhance the accuracy of positioning of the heater 22 with respect to the heater holder 23 and the first thermal equalization plate 28. Placing the first thermal equalization plate 28 on the heater 22 enhances heat transfer in the longitudinal direction and uniforms the temperature of the heater 22, and thus the temperature of the fixing belt 20 in the longitudinal direction. The first thermal equalization plate 28 made of metal has good workability and dimensional accuracy.

A description is now given of a method of calculating the thermal conductivity. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (for example, trade name: AI-PHASE MOBILE 1U, manufactured by Ai-Phase co., ltd.).

In order to convert the thermal diffusivity into thermal conductivity, values of density and specific heat capacity are necessary. The density is measured by a dry automatic densitometer (trade name: ACCUPYC 1330 manufactured by Shimadzu Corporation). The specific heat capacity is measured by a differential scanning calorimeter (trade name: DSC-60 manufactured by Shimadzu Corporation), and sapphire is used as a reference material in which the specific heat capacity is known. For example, the specific heat capacity is measured five times, and an average value at 50° C. is used.

The thermal conductivity λ is obtained by the following expression (20).

$$\lambda = \rho \times C \times \alpha. \tag{20}$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The guide face 260 of each of the guide ribs 26 contacts and guides the inner circumferential face of the fixing belt 20 to stably and smoothly rotate the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed in a direction indicated by the arrow A3 in FIG. 2 to the fixing nip N between the fixing belt 20 and the pressure roller 21, and the unfixed toner image is heated and pressed to be fixed to the sheet P.

Figure 3:
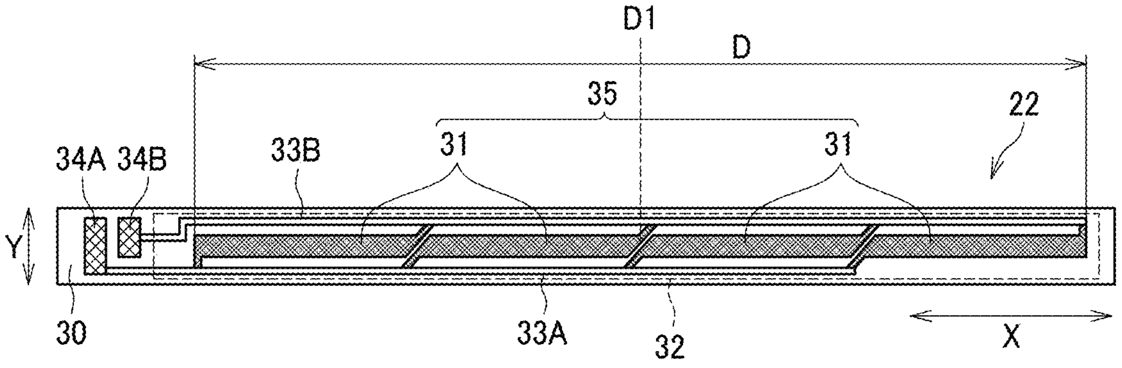
FIG. 3 is a plan view of a heater.

A detailed description is now given of the heater disposed in the above-described fixing device, with reference to FIG. 3. FIG. 3 is a plan view of the heater according to the present embodiment.

As illustrated in FIG. 3, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment. The power supply lines 33A and 33B are also referred to as power supply lines 33, and the first electrode 34A and the second electrode 34B are also referred to as electrodes 34.

A lateral direction X in FIG. 3 is the longitudinal direction of the heater 22, a direction orthogonal to the surface of the paper on which FIG. 2 is drawn, and an arrangement direction of the plurality of resistive heat generators 31. The direction X is also referred to as the arrangement direction in the following description. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 3. The direction Y intersecting the arrangement direction is a direction along the surface of the base 30 on which the resistive heat generators 31 are arranged and is also a short-side direction of the heater 22 and a conveyance direction of the sheet passing through the fixing device 9.

The resistive heat generators 31 configure a heat generation portion 35 including portions arranged in the arrangement direction. The resistive heat generators 31 are electrically coupled in parallel to a pair of electrodes 34A and 34B via the power supply lines 33A and 33B. The pair of electrodes 34A and 34B is disposed on one end of the base 30 in the arrangement direction that is a left end of the base 30 in FIG. 3. The power supply lines 33A and 33B are made of conductors having an electrical resistance value smaller than an electrical resistance value of the resistive heat generator 31. A gap between neighboring resistive heat generators 31 is preferably 0.2 mm or more, more preferably 0.4 mm or more from the viewpoint of maintaining the insulation between the neighboring resistive heat generators 31. If the gap between the neighboring resistive heat generators 31 is too large, the gap is likely to cause a temperature decrease in a region corresponding to the gap. Accordingly, from the viewpoint of reducing the temperature unevenness in the arrangement direction, the gap is preferably equal to or shorter than 5 mm, and more preferably equal to or shorter than 1 mm.

The resistive heat generator 31 is made of a material having a positive temperature coefficient (PTC) of resistance that is a characteristic that the resistance value increases to decrease the heater output as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 that is not in contact with the small sheet increases because the small sheet does not absorb heat of the fixing belt 20 in the region that is not in contact with the small sheet, in other words, the region outside a small sheet passing region of the fixing belt 20 on which the small sheet passes. Since a constant voltage is applied to the resistive heat generators 31, the temperature increase in the regions facing outsides of the small sheet passing region causes the increase in resistance values of the resistive heat generators 31. The increase in temperature relatively reduces outputs (that is, heat generation amounts) of the heater in the regions, thus preventing an increase in temperature in the regions that are end portions of the fixing belt outside the small sheets. Electrically coupling the plurality of resistive heat generators 31 in parallel can prevent a rise of temperature in non-sheet passing regions while maintaining the printing speed.

The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generator 31 is produced by, for example, mixing silver-palladium (AgPd) and glass powder into a paste. The paste is coated on the base 30 by screen printing. Finally, the base 30 is fired to form the resistive heat generator 31. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag) or silver palladium (AgPd) may be used as a material of the power supply lines 33A and 33B and the electrodes 34A and 34B. Screen-printing such material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of a stainless steel plate is resistant to cracking due to thermal stress.

To enhance the thermal uniformity of the heater 22 and image quality, the base 30 may be made of a material having high thermal conductivity, such as copper, graphite, or graphene.

The insulation layer 32 may be, for example, a heat-resistant glass layer having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

A region in which the resistive heat generators 31 are arranged in the longitudinal direction is a main heat generation region D of the heater 22. The main heat generation region D includes the gap between the resistive heat generators 31. In other words, the main heat generation region D of the heater 22 is from one end of the resistive heat generator 31 disposed closest to one end of the heater 22 in the longitudinal direction, to the other end of the resistive heat generator 31 disposed closest to the other end of the heater 22 in the longitudinal direction. The heater 22 mainly generates heat in the main heat generation region D and slightly generates heat in a region outside the main heat generation region D.

Figure 4:
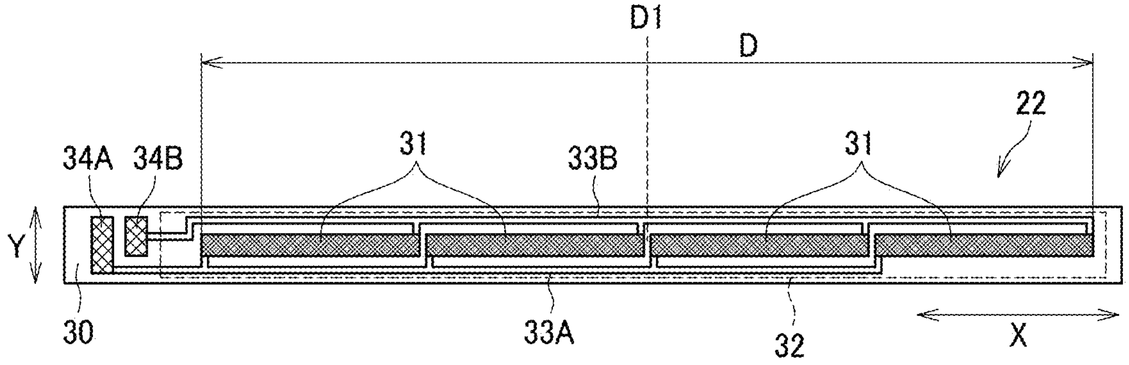
FIG. 4 is a plan view of a heater including resistive heat generators each having a form different from the form of the resistive heat generator illustrated in FIG. 3.
Figure 5:
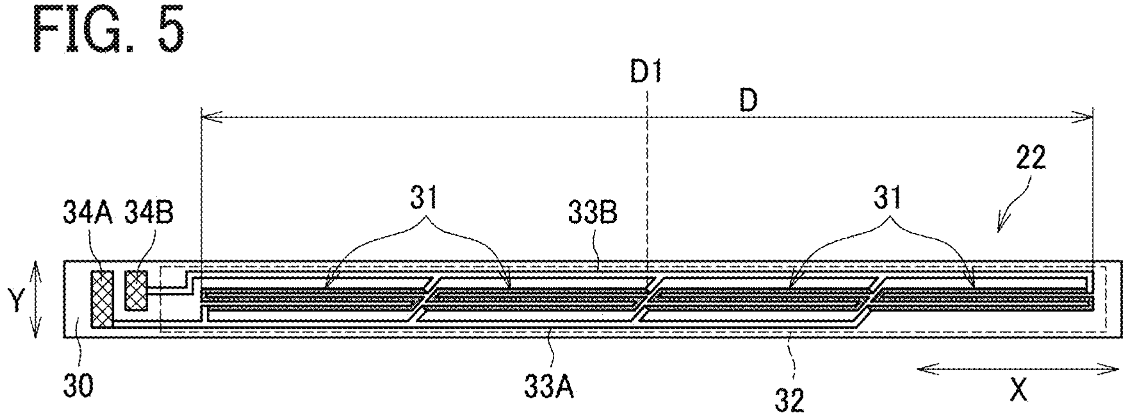
FIG. 5 is a plan view of a heater including resistive heat generators each having a form different from each of the forms of the resistive heat generators illustrated in FIGS. 3 and 4.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 4, the shape of resistive heat generator 31 may be a rectangular shape, or as illustrated in FIG. 5, the resistive heat generator 31 may be configured by a linear portion folding back to form a substantially parallelogram shape. In addition, as illustrated in FIG. 4, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 6:
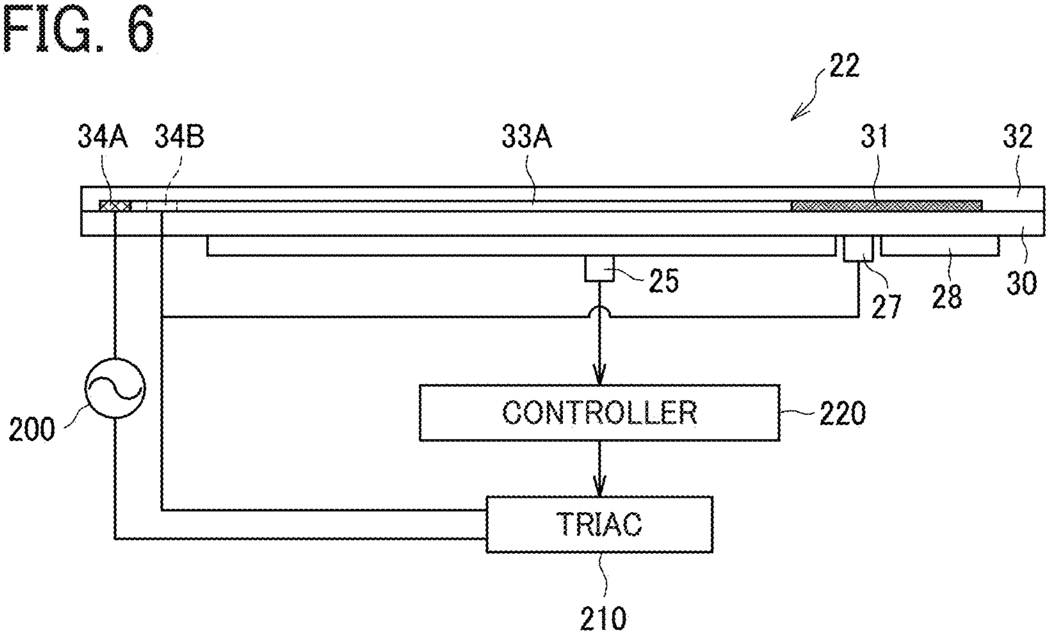
FIG. 6 is a schematic diagram illustrating a circuit to supply power to the heater.

FIG. 6 is a schematic diagram illustrating a circuit to supply power to the heater according to the present embodiment.

As illustrated in FIG. 6, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistor 25. The controller 220 includes a microcomputer including, for example, a central processing unit (CPU), a read-only memory (ROM), a random-access memory (RAM), and an input and output (I/O) interface. The controller 220 may be disposed in the fixing device or the housing of the image forming apparatus.

In the present embodiment, the thermistor 25 as a temperature detector is disposed in a center region of the heater 22 in the longitudinal direction, and the center region corresponds to a minimum sheet passing region in which the sheet having the smallest width of widths of the sheets used in the fixing device in the longitudinal direction passes through the fixing device. A thermostat 27 as a power cut-off device is disposed at the other end of the heater 22 in the longitudinal direction and cuts off the power supply to the resistive heat generators 31 when the temperature of the heater 22 becomes a predetermined temperature or higher. However, the present disclosure is not limited to the above. For example, an end thermistor may be disposed at an end of the heater corresponding to an end of a maximum sheet passing region in which the sheet having the largest width of widths of the sheets used in the fixing device in the longitudinal direction passes through the fixing device.

Such a heating device has an issue to uniform the temperature distribution of a rotator in the longitudinal direction and eliminate temperature unevenness. In this respect, a fixing device according to a comparative example, which is different from the present embodiment, is described below with reference to FIG. 7.

In the fixing device according to the comparative example, the resistive heat generators 31 are arranged symmetrically with respect to a center position E1 of a maximum sheet passing region E in which the sheet P1 having the largest width of widths of the sheets used in the fixing device in the longitudinal direction passes through the fixing device. In other words, in the longitudinal direction, the center position D1 of the main heat generation region D of the heater corresponds to the center position E1 of the maximum sheet passing region E. In the longitudinal direction, a length from one end of the resistive heat generators 31 to the center position D1 is set to be equal to a length from the other end of the resistive heat generators 31 to the center position D1, and a width in the resistive heat generators in a short-side direction of the heater is set to be the same. Accordingly, a heat generation amount in one region from the one end of the resistive heat generator 31 to the center position D1 is substantially equal to a heat generation amount in the other region from the other end of the resistive heat generator 31 to the center position D1.

Figure 7:
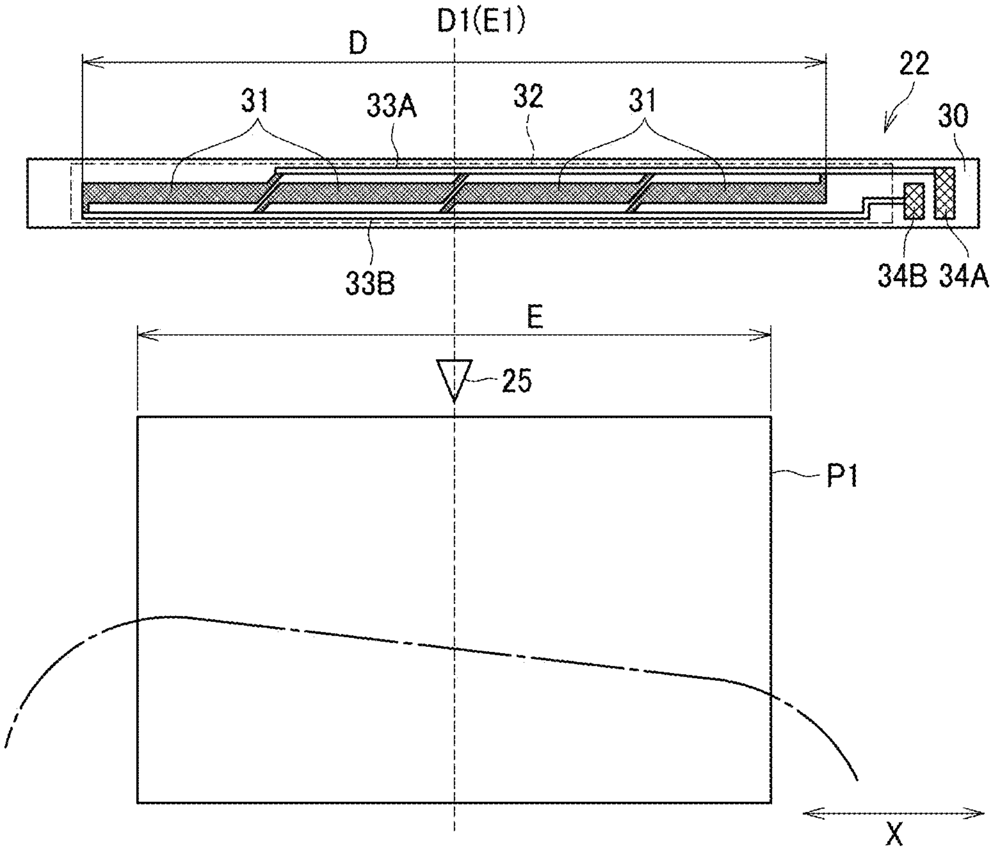
FIG. 7 is a diagram illustrating a temperature distribution of a heater and a fixing belt in a fixing device according to a comparative example different from an embodiment.

In contrast, in the longitudinal direction of the base 30, the base 30 has one region from one end of the base 30 to the center of the base 30 (that is the right region of the base 30 in FIG. 7) and the other region from the other end of the base 30 to the center of the base 30, and the one region on which the first electrode 34A and the second electrode 34B are disposed is longer than the other region. In other words, a protrusion amount from the main heat generation region D toward the right end of the base 30 in FIG. 7 is larger than a protrusion amount from the main heat generation region D toward the left end of the base 30 in FIG. 7. As a result, the heat of the heater 22 is more likely to flow to the outside in the longitudinal direction on the right region of the base in FIG. 7 than on a left region of the base 30 in FIG. 7, which generates a temperature distribution in the heater 22 as indicated by the alternate long and short dash line in FIG. 7, and thus generates a similar temperature distribution in the fixing belt 20. In FIG. 7, the temperature in the left region is higher than the temperature in the right region.

As described above, a heater including an asymmetrical base in a lateral direction causes an issue that the rotator has an uneven temperature distribution in the longitudinal direction. The above-described issue is referred to as Issue 1 in the following description.

The alternate long and short dash line in FIG. 7 schematically illustrates the temperature distribution of the heater 22 in the longitudinal direction of the heater 22. In FIG. 7, the vertical direction represents the temperature, and the horizontal direction represents the position on the heater 22 in the longitudinal direction of the heater 22. The higher the dot on the alternate long and short dash line in FIG. 7, the higher the temperature, and the lower it is, the lower the temperature. FIGS. 8 to 12 also represent the temperature distribution of the heater 22 in the same way. The temperature distribution of the fixing belt 20 tends to be the same as the temperature distribution of the heater 22.

The heating device has another issue, how to appropriately control the temperature at an end of the rotator in the longitudinal direction of the rotator. The heat of the end portion of the rotator in the longitudinal direction transfers to a member outside the rotator in the longitudinal direction. As a result, the temperature at the end portion of the rotator tends to be lower than the temperature at the center of the rotator in the longitudinal direction particularly when the heater is energized to heat the rotator cooled. The above-described issue is referred to as Issue 2 or "a temperature drop at the end portion" in the following description.

Figure 8:
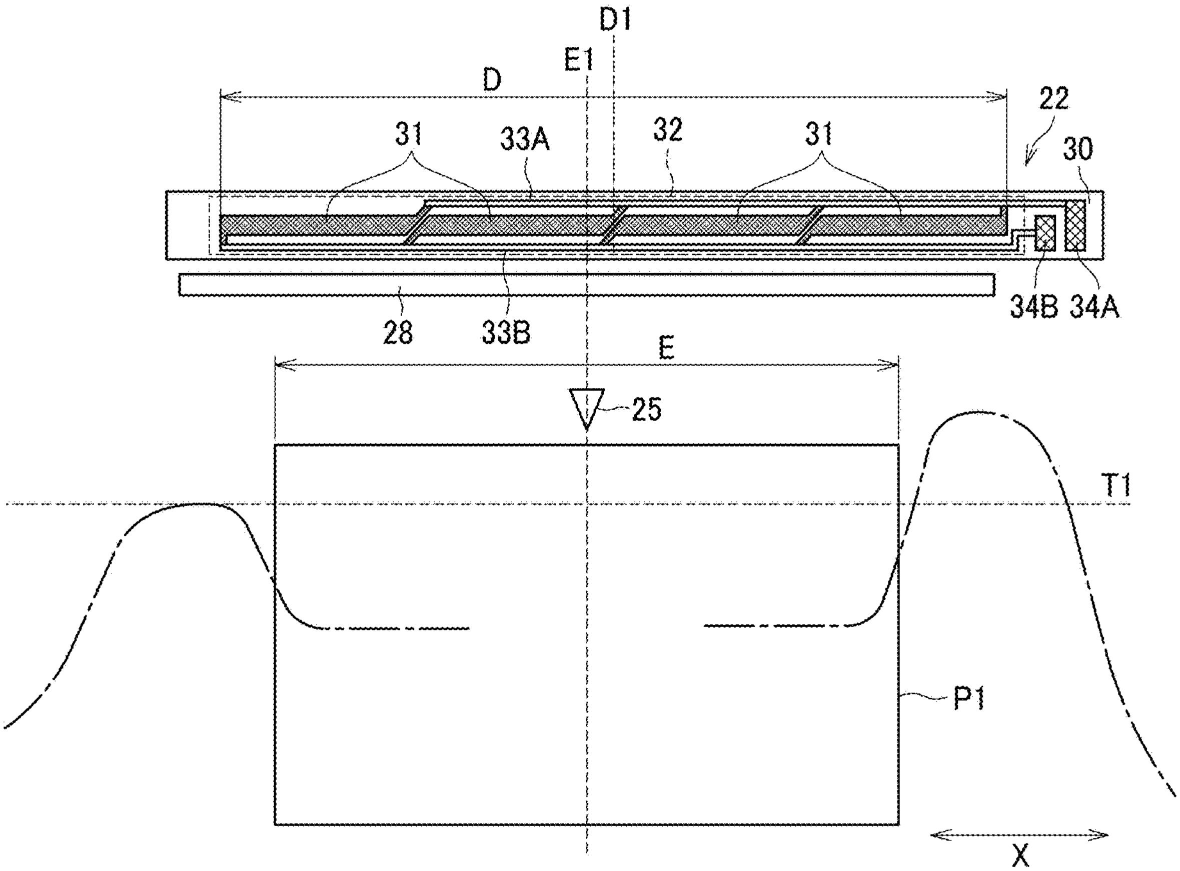
FIG. 8 is a diagram illustrating an excessive temperature rise at an end portion of a heater and a fixing belt in the fixing device according to the comparative example.

The following may be considered as the countermeasure against the above-described issue. For example, a length of the main heat generation region D, in other words, a length of the resistive heat generator 31 at a portion having lower temperature is increased as illustrated in FIG. 8 to solve the temperature drop at the end portion.

However, in the above-described structure, continuously performing the fixing operations on the sheets causes another issue that is an excessive temperature rise in an extended end portion of the main heat generation region D of the heater 22 in the longitudinal direction that results in an excessive temperature rise in an end portion of the fixing belt 20. If the heater 22 has the main heat generation region D larger than the width of the sheet P passing through the fixing device 9, the main heat generation region D has a non-sheet-passing region by which the sheet P does not pass. Since the heat is not absorbed by the sheet P in the non-sheet-passing region, the excessive temperature rise occurs in the end portion of the heater 22 and the end portion of the fixing belt 20 in the longitudinal direction. As indicated by an alternate long and short dash line in FIG. 8, the temperature of the heater 22 exceeds a breakage temperature T1 corresponding to a temperature at which the fixing belt is broken during the above-described continuous fixing operations. The above-described issue is referred to as Issue 3 or "an excessive temperature rise at the end portion" in the following description.

Additionally, the heating device has an issue to reduce power consumption of the heater as much as possible in order to save energy of the heating device. In particular, the rotator having a temperature difference between the left portion and the right portion is heated by the heater so that the temperature of the rotator having a lower temperature reaches the target temperature. As a result, the portion having a higher temperature of the rotator is heated excessively, and power consumption increases. In the following description, energy saving of the heating device is referred to as Issue 4. As the countermeasure against Issue 2 and Issue 3, the high thermal conductor may be processed to have parts having different shapes. For example, the high thermal conductor may be partially processed to have a notch at a particular position in the circumferential direction and at an end in the longitudinal direction of the high thermal conductor. However, the above-described countermeasure causes an issue that the processing cost of the high thermal conductor increases. The above-described issue is referred to as Issue 5 in the following description.

Figure 9:
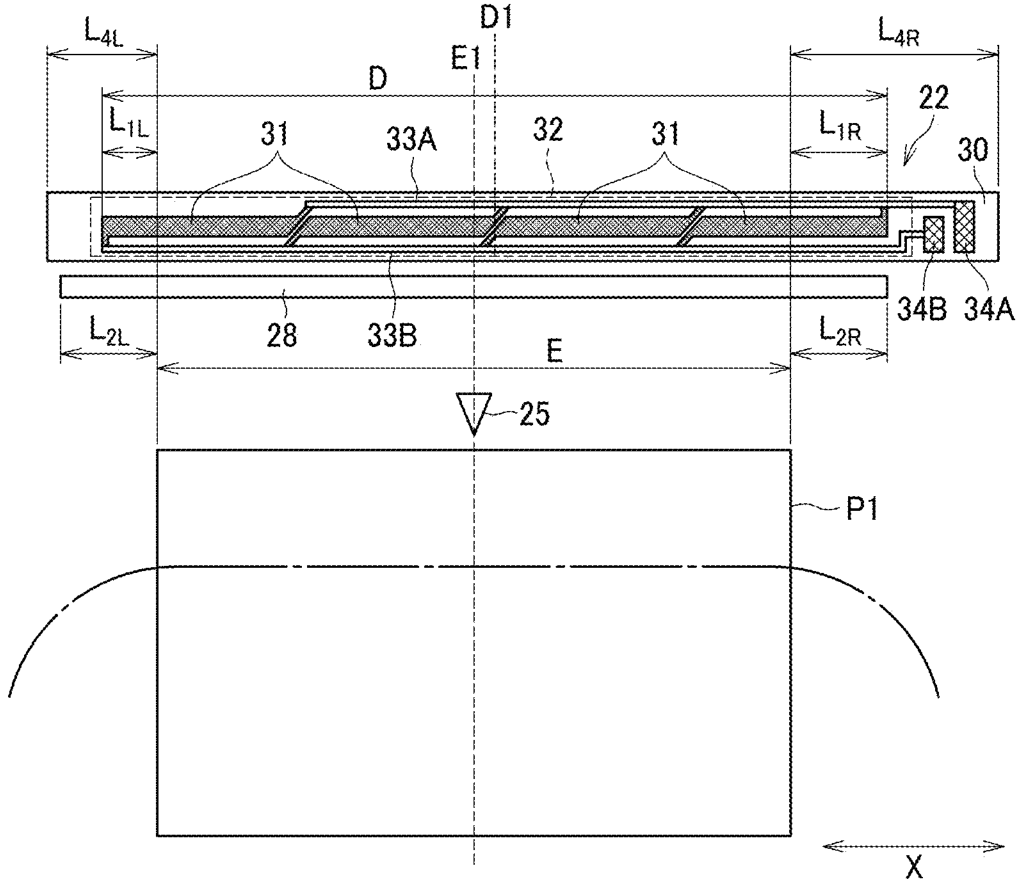
FIG. 9 is a diagram illustrating an arrangement of a heater and a first thermal equalization plate in a longitudinal direction of the heater and a temperature distribution of a fixing belt in the longitudinal direction in a fixing device of an embodiment.

With reference to FIG. 9, the following describes the configuration according to the present embodiment that solves the above-described issues and uniforms the temperature distribution of the fixing belt 20 in the longitudinal direction.

As illustrated in FIG. 9, both ends of the base 30 according to the present embodiment protrude outside from the main heat generation region D in the longitudinal direction. In the longitudinal direction, one protrusion amount as a first protrusion amount L5L that is a length from one end of the main heat generation region D to one end of the base 30 is different from another protrusion amount as a second protrusion amount L5R that is a length from another end of the main heat generation region D to another end of the base 30. In the above, the one end of the main heat generation region D is closer to the one end of the base 30 than to said another end of the base 30, and said another end of the main heat generation region D is closer to said another end of the base 30 than to the one end of the base 30. In other words, the base has a first base portion protruding from the one end of the main heat generation region (D) to the one end of the base 30 by a first protrusion amount L5L and a second base portion protruding from said another end of the main heat generation region to said another end of the base by a second protrusion amount L5R larger than the first protrusion amount of the first base portion.

Specifically, as illustrated in FIG. 9, the first protrusion amount L5L in the left part of the base 30 is smaller than the second protrusion amount L5R in the right part of the base 30. As described above with reference to FIG. 7, when the heater 22 generates heat by itself without the first thermal equalization plate 28, the temperature on the right part of the heater 22 in FIG. 9 is lower than that on the left part of the heater 22 in FIG. 9. In the following description, the left part from the center position D1 in FIG. 9 including the left part of the base 30 that has the smaller protrusion amount is referred to as a first part of the fixing device in the longitudinal direction, and the right part from the center position D1 in FIG. 9 is referred to as a second part of the fixing device in the longitudinal direction. The one end of the base 30 and the one end of the heat generation region are in the first part.

In the present embodiment, a protrusion amount from the right end of the maximum sheet passing region E to the right end of the main heat generation region D in FIG. 9 is larger than a protrusion amount from the left end of the maximum sheet passing region E to the left end of the main heat generation region D in FIG. 9. In other words, the main heat generation region D has a first heater portion protruding from the one end of the maximum sheet passing region E to the one end of the main heat generation region D by a third protrusion amount L1L and a second heater portion protruding from said another end of the maximum passing region E to said another end of the main heat generation region D by a fourth protrusion amount L1R. In FIG. 9, the fourth protrusion amount L1R is larger than the third protrusion amount L1L.

Energizing the heater 22 itself that is not incorporated in the heating device at a low duty such as a duty of 50% or less and measuring the temperature distribution in the longitudinal direction with a temperature measuring device such as a thermography camera gives the temperature distribution as indicated by the alternate long and short dash line in FIG. 7. The temperature distribution is typically measured after temperature increase saturates, for example, after the temperature change is less than 5° C. Specifically, a portion of the base from the center D1 of the main heat generation region D to the one end of the base (that is the left end of the base 30 in FIG. 7) is referred to as a first portion of the base, and a portion of the base from the center D1 to said another end of the base is referred to as a second portion of the base. The saturation temperature of the first portion is higher than the saturation temperature of the second portion in the above-described temperature distribution of the heater 22 alone. As illustrated in FIG. 9, the length of the base 30 in the first part is shorter than the length of the base 30 in the second part.

Both ends of the main heat generation region D protrude from both ends of the maximum sheet passing region E in the longitudinal direction. Both ends of the first thermal equalization plate 28 protrude from both ends of the maximum sheet passing region E in the longitudinal direction. The maximum sheet passing region E is shorter than the main heat generation region D in the longitudinal direction. In other words, the first thermal equalization plate 28 extends from one end to another end in the longitudinal direction, and the maximum sheet passing region has one end and another end in the longitudinal direction.

The one end of the first thermal equalization plate 28 and the one end of the maximum sheet passing region are in the first part and closer to the one end of the base 30 than to said another end of the base 30. Said another end of the first thermal equalization plate 28 and said another end of the maximum sheet passing region are in the second part and closer to said another end of the base 30 than to the one end of the base 30. The first thermal equalization plate 28 as the thermal conductor has a first conductor portion and a second conductor portion that are defined as follows. The first conductor portion is a portion protruding from the one end of the maximum sheet passing region E to the one end of the first thermal equalization plate 28 by a fifth protrusion amount L2L. The second conductor portion is a portion protruding from said another end of the maximum sheet passing region E to said another end of the first thermal equalization plate 28 by a sixth protrusion amount L2R.

The length of the main heat generation region D and the length of the first thermal equalization plate 28 in the present embodiment are set to satisfy the following expressions (21) and (22).

$$L1R \leq L2R \leq L1R + 1 \text{ (mm)} \tag{21}$$

$$0 \leq L3R < L3L \text{ (mm)} \tag{22}$$

In the above, L1R (mm) is the fourth protrusion amount that is a protrusion amount of the main heat generation region D with respect to the maximum sheet passing region E in the second part in the longitudinal direction, that is, the length from said another end of the maximum sheet passing region E to said another end of the main heat generation region D in the longitudinal direction. L2R (mm) is the sixth protrusion amount that is a protrusion amount of the first thermal equalization plate 28 with respect to the maximum sheet passing region E in the second part in the longitudinal direction, that is, the length from said another end of the maximum sheet passing region E to said another end of the first thermal equalization plate 28. L3R [mm] is the difference L2R–L1R. L3L [mm] is the difference L2L–L1L. L1L (mm) is the third protrusion amount that is a protrusion amount of the main heat generation region D with respect to the maximum sheet passing region E in the first part in the longitudinal direction, that is, the length from the one end of the maximum sheet passing region E to the one end of the main heat generation region D in the longitudinal direction. L2L (mm) is the fourth protrusion amount that is a protrusion amount of the first thermal equalization plate 28 with respect to the maximum sheet passing region E in the first part in the longitudinal direction, that is, the length from the one end of the maximum sheet passing region E to the one end of the first thermal equalization plate 28 in the longitudinal direction. In particular, the first thermal equalization plate 28 and the main heat generation region D in the present embodiment are designed to have lengths satisfying L2R=L1R.

Satisfying the expression L3R<L3L results in the protrusion amount of the first thermal equalization plate 28 in the first part in which the temperature of the heater 22 is higher to be set larger than the protrusion amount of the first thermal equalization plate 28 in the second part. Accordingly, the first thermal equalization plate 28 transfers more heat to the outside in the longitudinal direction in the first part than in the second part. As a result, the above-described structure reduces the temperature of the heater 22 in the first part to reduce the difference in the temperature between one end and another end in the heater as indicated by the alternate long and short dash line in FIG. 9. In other words, Issue 1, the uneven temperature distribution of the heater can be solved.

In the second part in which the temperature of the heater 22 is low, the main heat generation region D protrudes from the maximum sheet passing region E, and satisfying the expression (21) results in the main heat generation region D to have the length substantially equal to the length of the first thermal equalization plate 28. As a result, the heating device can sufficiently heat an end of the fixing belt 20 in the second part to solve Issue 2, the temperature drop at the end portion. In other words, the first thermal equalization plate 28 sufficiently protruding from the main heat generation region D in the second part transfers the heat from the heater 22 and the fixing belt 20 toward the outside in the longitudinal direction to increase the temperature drop at the end portion of the fixing belt 20. However, in the present embodiment, this can be avoided.

Satisfying the expression (22), the first thermal equalization plate 28 is equal to or longer than the main heat generation region D in the first part and the second part. The first thermal equalization plate 28 faces the non-sheet passing region inside the main heat generation region D and outside the maximum sheet passing region E in the longitudinal direction. As a result, the first thermal equalization plate 28 can sufficiently transfer heat from the non-sheet passing region to the outside of the non-sheet passing region even under the condition that the heat generation of the heater 22 may increase the temperature in the non-sheet passing region during the fixing operation.

Figure 10:
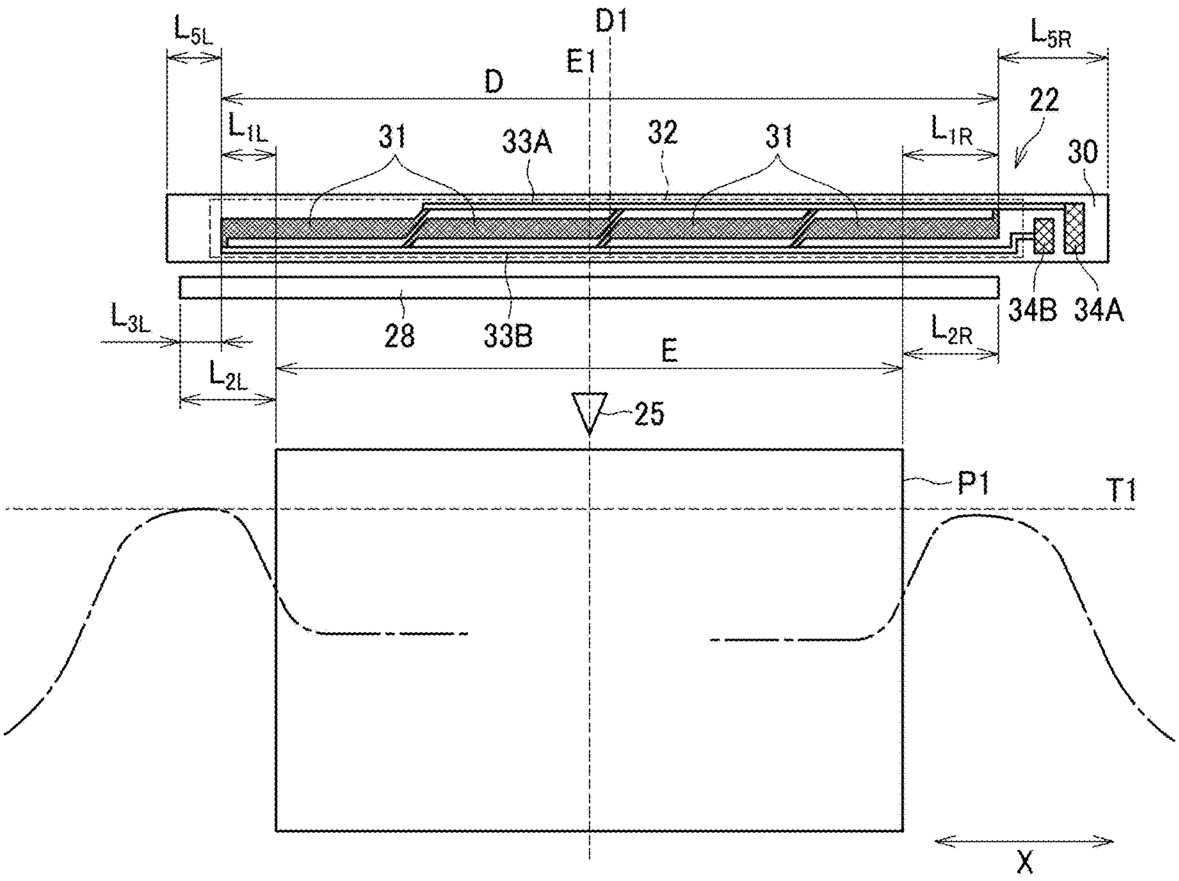
FIG. 10 is a diagram illustrating a temperature distribution of the fixing belt in the longitudinal direction in the fixing device of FIG. 9 under a condition in which the excessive temperature rise occurs in the fixing device of FIG. 8.

In particular, setting L3R<L3L increases the protrusion amount of the first thermal equalization plate 28 with respect to the main heat generation region D in the first part in which the temperature tends to be high. In other words, setting L3R<L3L increases the length from the one end of the main heat generation region D to the one end of the first thermal equalization plate 28. As a result, the first thermal equalization plate can effectively prevent the temperature of the end portion of the fixing belt facing the non-sheet passing region in the first part from rising. Thus, the above-described structure can prevent the excessive temperature rise of the heater 22 and the fixing belt 20 in the maximum sheet passing region E as illustrated in FIG. 10. In other words, Issue 3 can be solved.

In the present embodiment, the length of the main heat generation region D in the second part is designed to be equal to the length of the first thermal equalization plate 28 in the second part. In other words, the length from said another end of the maximum sheet passing region E to said another end of the main heat generation region D in the longitudinal direction is designed to be equal to the length from said another end of the maximum sheet passing region E to said another end of the first thermal equalization plate 28 in the longitudinal direction. However, considering manufacturing tolerances, the first thermal equalization plate 28 may protrude from the main heat generation region D by 1 mm or less. Even in this structure, substantially the same effect can be obtained.

As described above, satisfying the expressions (21) and (22) can solve Issue 1, Issue 2, and Issue 3. In other words, satisfying the expression (21) and (22) reduces the temperature difference between the left portion and the right portion in the heater 22 and the fixing belt 20 and prevents the occurrence of the temperature drop and the excessive temperature rise at the end portion of the heater 22 and the fixing belt 20. The above-described effect enables the target temperature of the heater 22 to be set lower, which reduces the heat generation amount of the heater 22. As a result, the energy consumption of the heater 22 can be reduced. Thus, the Issue 4 can be solved. Adjusting the lengths of the resistive heat generator 31 and the first thermal equalization plate 28 can solve the above-described issues and does not increase the processing cost of the first thermal equalization plate 28. Thus, the Issue 5 can be solved.

As described above, the fixing device 9 according to the present embodiment can solve Issue 1 to Issue 5 and provide an inexpensive configuration having the reduced temperature difference of the fixing belt 20 in the longitudinal direction.

The base 30 and the first thermal equalization plate 28 may be designed to have lengths satisfying the following expressions (23) and (24) as illustrated in FIG. 9.

$$L2L \leq L4L \tag{23}$$

$$L2R \leq L4R \tag{24}$$

Where L4L (mm) is a protrusion amount of the base 30 with respect to the maximum sheet passing region E in the first part in the longitudinal direction that is the length from the one end of the maximum sheet passing region E to the one end of the base 30 in the longitudinal direction, and L4R (mm) is a protrusion amount of the base 30 with respect to the maximum sheet passing region E in the second part in the longitudinal direction that is the length from said another end of the maximum sheet passing region E to said another end of the base 30 in the longitudinal direction.

As in the above expressions (23) and (24), the protrusion amount of each of both ends of the first thermal equalization plate 28 in the longitudinal direction may be designed to be smaller than the protrusion amount of each of both ends of the base 30 in the longitudinal direction. In the above, the first thermal equalization plate 28 on the base 30 moves heat in the longitudinal direction of the base 30 and prevents the heat from flowing to the outside of the base 30 in the longitudinal direction. Thus, the Issue 2, the temperature drop at the end portion can be prevented.

The base 30, the first thermal equalization plate 28, and the main heat generation region D in the present embodiment may be designed to satisfy the following expression. 0.

$$6 \leq AL/AR \leq 1.4 \tag{25}$$

or $$0.8 \leq AL/AR \leq 1.2. \tag{26}$$

where AL and AR in the above expressions are defined as follows.

$$AL = \lambda1 \times V1L + \lambda2 \times V2L.$$

$$AR = \lambda1 \times V1R + \lambda2 \times V2R$$

Where

λ1 is the thermal conductivity [W/m·K] of the base 30,

λ2 is the thermal conductivity [W/m·K] of the first thermal equalization plate 28, V1L is the volume [$mm^3$] of the first base portion that is a protrusion portion of the base 30 with respect to the main heat generation region D in the first part, in other words, the volume [$mm^3$] of the protrusion portion of the base 30 from the one end of the main heat generation region D to the one end of the base 30 in the longitudinal direction, i.e., the volume [$mm^3$] of the portion indicated by the length L5L in FIG. 10, V2L is the volume [$mm^3$] of a protrusion portion of the first thermal equalization plate 28 with respect to the main heat generation region D in the first part, in other words, the volume [$mm^3$] of the protrusion portion of the first thermal equalization plate 28 from the one end of the main heat generation region D to the one end of the first thermal equalization plate 28 in the longitudinal direction, i.e., the volume [$mm^3$] of the portion indicated by the length L3L in FIG. 10, V1R is the volume [$mm^3$] of the second base portion that is a protrusion portion of the base 30 with respect to the main heat generation region D in the second part, in other words, the volume [$mm^3$] of the protrusion portion of the base 30 from said another end of the main heat generation region D to said another end of the base 30 in the longitudinal direction, i.e., the volume [$mm^3$] of the portion indicated by the length L5R in FIGS. 10, and V2R is the volume [$mm^3$] of a protrusion portion of the first thermal equalization plate 28 with respect to the main heat generation region D in the second part, in other words, the volume [$mm^3$] of the protrusion portion of the first thermal equalization plate 28 from said another end of the main heat generation region D to said another end of the first thermal equalization plate 28 in the longitudinal direction.

In FIG. 10, since the main heat generation region D and the first thermal equalization plate 28 have the same length on the second part, a portion corresponding to the volume V2R does not exist in FIG. 10. In other words, V2R is designed to 0 in FIG. 10. In the above expression, λ1×V1L is the product of the thermal conductivity of the base 30 and the volume of the protrusion portion of the base 30 with respect to the main heat generation region D in the first part, λ2×V2L is the product of the thermal conductivity of the first thermal equalization plate 28 and the volume of the protrusion portion of the first thermal equalization plate 28 with respect to the main heat generation region D in the first part, and AL=λ1×V1L+λ2×V2L is the total value of these values. In addition, λ1×V1R is the product of the thermal conductivity of the base 30 and the volume of the protrusion portion of the base 30 with respect to the main heat generation region D in the second part, λ2×V2R is the product of the thermal conductivity of the first thermal equalization plate 28 and the volume of the protrusion portion of the first thermal equalization plate 28 with respect to the main heat generation region D in the second part, and AR=λ1×V1R+λ2×V2R is the total value of these values.

The above-described values, AL and AR are used as evaluation indexes of the deviation of the heat amount between the first part and the second part. Satisfying the expression (25), that is, not setting a large difference between the values of AL and AR can maintain the heat balance between the first part and the second part and reduce the temperature unevenness of the fixing belt 20 in the longitudinal direction. As a result, satisfying the expression (25) enables the target temperature of the heater 22 to be set lower and can reduce the excessive temperature rise at the end portion regarding Issue 3. Additionally, the above-described structure can save energy of the fixing device 9.

Further, satisfying the expression (26) can further reduce the temperature unevenness of the fixing belt 20 in the longitudinal direction and further save the energy of the fixing device 9.

Since adjusting the lengths of the base 30 and the first thermal equalization plate 28 can satisfy the above expressions, Issue 5, that is, the increase in the processing cost does not occur. Table 1 is a list of setting values regarding AL and AR in the present embodiment. The lengths in Table 1 mean the protrusion amounts of the base 30 and the first thermal equalization plate 28 with respect to the main heat generation region D in the first part and the second part. As listed in Table 1, values of the base 30, the first thermal equalization plate 28, and the main heat generation region D in the present embodiment are designed to satisfy the expression (26). AL that is 8248.4 divided by AR that is 6929.44 substantially equals 1.19.

TABLE 1

| | FIRST PART | | SECOND PART | |
|---|---|---|---|---|
| | BASE | FIRST THERMAL EQUALIZATION PLATE | BASE | FIRST THERMAL EQUALIZATION PLATE |
| MATERIAL | ALUMINA | ALUMINUM | ALUMINA | ALUMINUM |
| THERMAL CONDUCTIVITY (W/(m · K)) | 23 | 137 | 23 | 137 |
| WIDTH IN SHORT-SIDE DIRECTION (mm) | 11.2 | 11 | 11.2 | 11 |
| THICKNESS (mm) | 1 | 0.3 | 1 | 0.3 |
| LENGTH (mm) | 25 | 4 | 26.9 | 0 |
| VOLUME × THERMAL CONDUCTIVITY | 6440 | 1808.4 | 6929.440 | 0 |
| SUM OF ABOVE VALUES OF BASE AND FIRST THERMAL EQUALIZATION PLATE | 8248.4 | | 6929.44 | |

Figure 11:
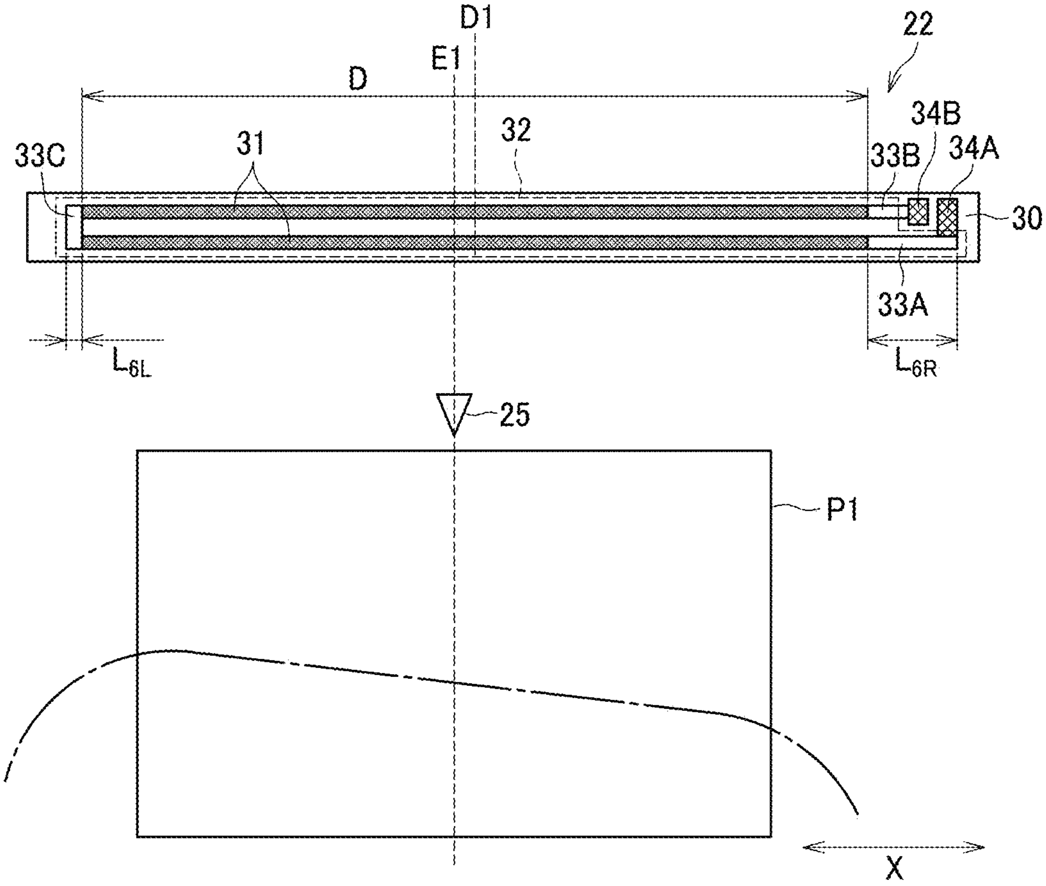
FIG. 11 is a diagram illustrating a temperature deviation between a left region and a right region in a heater including power supply lines having different lengths in the left region and the right region.

In the above description, the length of the first part of the base 30 different from the length of the second part of the base 30 causes Issue 1 that is the temperature difference of the heater 22 in the lateral direction, but the present disclosure is not limited this. For example, the heater 22 illustrated in FIG. 11 includes two resistive heat generators 31 extending in the longitudinal direction and coupled in series. The right ends of the two resistive heat generators 31 in FIG. 11 are coupled to the electrodes 34A and 34B via power supply lines 33A and 33B, respectively. The left ends of the two resistive heat generators 31 in FIG. 11 are coupled in series via a power supply line 33C. Regarding the power supply lines 33A to 33C that are conductors disposed in the heater 22, the power supply line 33C in the left region of the heater 22 in FIG. 11 has a length L6L [mm] outside the main heat generation region D, whereas the power supply line 33A and the power supply line 33B in the right region of the heater 22 in FIG. 11 are in a range having a length L6R [mm] outside the main heat generation region D. The power supply lines 33A to 33C of the present embodiment are made of metal and have higher thermal conductivity than the base.

As described above, a preferable material for the first thermal equalization plate 28 is aluminum having high thermal conductivity. The first thermal equalization plate 28 made of aluminum enhances the heat transfer in the fixing belt 20 in the longitudinal direction to reduce the temperature drop at the end portion of the fixing belt 20 regarding Issue 2 and the excessive temperature rise at the end portion of the fixing belt 20 regarding Issue 3.

Grease 29 as lubricant is preferably interposed between the heater 22 and the fixing belt 20, as shown in FIG. 2. The grease 29 prevents a gap from being formed between the heater 22 and the fixing belt 20, which can efficiently transfer heat from the heater 22 to the fixing belt 20. The heater 22 can efficiently heat the fixing belt 20, which reduces the temperature drop at the end portion regarding Issue 2 and achieves the energy saving of the fixing device regarding Issue 4. In addition, since the heater 22 is less likely to be heated to a high temperature, the excessive temperature rise at the end portion regarding Issue 3 can be reduced.

As a result, the right region of the heater 22 includes longer power supply lines 33A and 33B than the power supply line 33C, and the heat of the heater 22 is more likely to flow to the outside in the longitudinal direction on the right region of the heater 22 in FIG. 11 than on the left region of the heater 22 in FIG. 11, which generates a temperature distribution in the heater 22 as indicated by an alternate long and short dash line in FIG. 11 in which the temperature in the right region in FIG. 11 is lower than the temperature in the left region in FIG. 11.

In other words, the left region of the heater in FIG. 11 including a first conductor having a smaller protrusion amount with respect to the main heat generation region generates the first part in the longitudinal direction. In addition, the right region in FIG. 11 including a second conductor having a larger protrusion amount with respect to the main heat generation region generates the second part in the longitudinal direction. In other words, the first conductor adjacent to the one end of the main heat generation region D is shorter than the second conductor adjacent to said another end of the main heat generation region D. As a result, the temperature deviation between the left and right regions of the heater 22, that is, Issue 1 occurs. The right region of the heater 22 in FIG. 9 also includes longer power supply lines. The conductors are provided asymmetrically on the left region and the right region. That is, the left region in FIG. 9 generates the first part, and the right region in FIG. 9 generates the second part.

Figure 12:
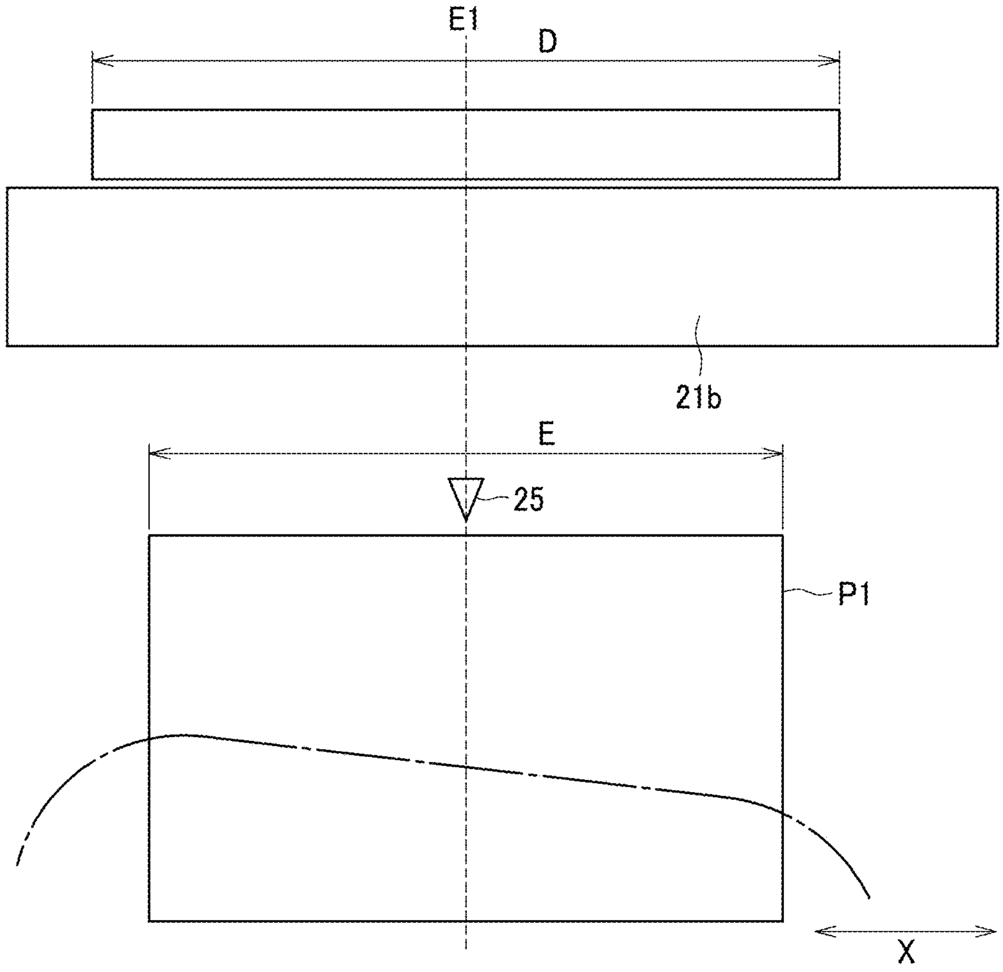
FIG. 12 is a diagram illustrating a temperature deviation between a left region and a right region in a heater including a pressure roller that has an elastic layer having different lengths in the left region and the right region.

In the embodiment illustrated in FIG. 12, the lengths of the left and right regions of the elastic layer 21*b* on the pressure roller are asymmetric. In other words, in FIG. 12, a protrusion amount of the left region of the elastic layer 21*b* that protrudes outside from the main heat generation region D in the longitudinal direction is different from a protrusion amount of the right region of the elastic layer 21*b* that protrudes outside from the main heat generation region D in the longitudinal direction. Specifically, the protrusion amount in the right region of FIG. 12 is larger than that in the left region of FIG. 12. Accordingly, the pressure roller transfers more heat to the outside in the longitudinal direction in the right region of FIG. 12 than in the left region. The above-described structure generates a temperature distribution in the pressure roller, the fixing belt, and the heater as indicated by an alternate long and short dash line in FIG. 12 in which the temperature in the right region in FIG. 12 is lower than the temperature in the left region in FIG. 12.

In other words, the left region of the elastic layer in FIG. 12 having a smaller protrusion amount with respect to the main heat generation region generates the first part in the longitudinal direction. In addition, the right region of the elastic layer in FIG. 12 having a larger protrusion amount with respect to the main heat generation region generates the second part in the longitudinal direction. In other words, the left part in FIG. 12 including a left part of the elastic layer from the center position E1 of the maximum sheet passing region E to the left end of the elastic layer, which has a shorter length, generates the first part in the longitudinal direction. The right part in FIG. 12 including a right part of the elastic layer from the center position E1 to the right end of the elastic layer, which has a longer length than the left part, generates the second part in the longitudinal direction. The difference in length of the elastic layer causes Issue 1, the temperature deviation between the left and right regions of the heater 22.

In addition, the above-described configuration of the present embodiment can be applied to the fixing device including another component that causes the temperature difference between the left region and the right region in the heater and the rotator in the longitudinal direction, which is caused by having one length from the center position E1 or the center position D1 to one end of said another component in the longitudinal direction different from the other length from the center position E1 or the center position D1 to the other end of said another component in the longitudinal direction, or having one protrusion amount from one end of the main heat generation region to the one end of said another component different from the other protrusion amount from the other end of the main heat generation region to the other end of said another component. Alternatively, the above-described configuration of the present embodiment can also be applied to a device including a specific component disposed in one of the first part and the second part in the longitudinal direction, such as a thermistor, that causes a temperature deviation between the left and right regions in the longitudinal direction in the heater or the rotator.

Figure 13:
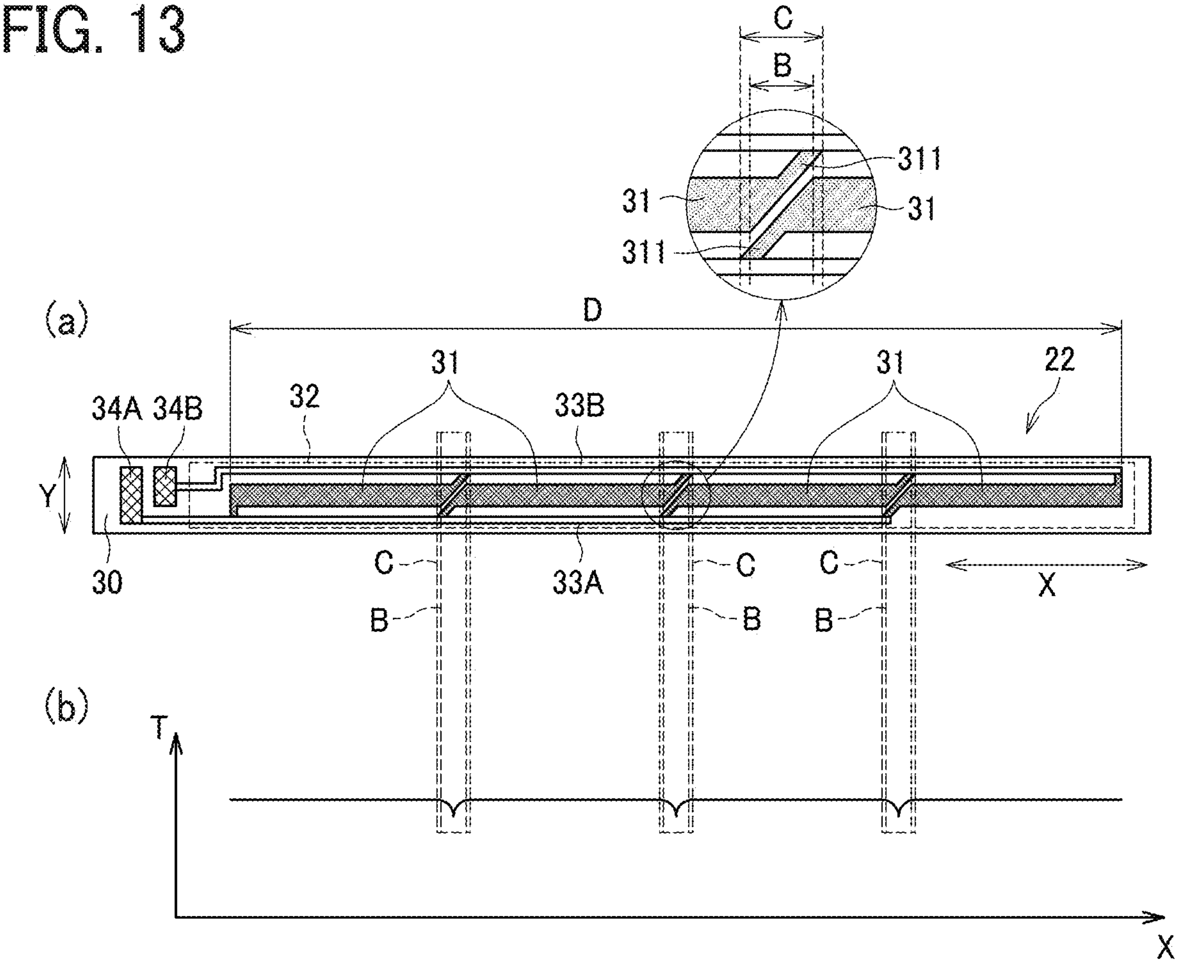
FIG. 13 includes a plan view (a) of the heater of FIG. 3 and a graph (b) illustrating a temperature distribution of the fixing belt in an arrangement direction of the resistive heat generators of the heater of FIG. 3.

FIG. 13 is a diagram illustrating a temperature distribution of the fixing belt 20 in the arrangement direction. FIG. 13 (a) illustrates the arrangement of the resistive heat generators 31 of the heater 22. In the graph (b), a vertical axis represents the temperature T of the fixing belt 20, and a horizontal axis represents the position of the fixing belt 20 in the arrangement direction.

As illustrated in FIG. 13(*a*), the plurality of resistive heat generators 31 of the heater 22 are separated from each other in the arrangement direction to form separation areas B including gap areas between the neighboring resistive heat generators 31.

In other words, the heater 22 has gap areas between the plurality of resistive heat generators 31. As illustrated in an enlarged view of FIG. 13(*a*), the separation area B includes the entire gap area sandwiched by the adjoining resistive heat generators 31. In addition, the separation area B includes parts of the resistive heat generators sandwiched between lines extending in a direction orthogonal to the longitudinal direction from both ends of the gap area in the longitudinal direction.

The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 facing the separation area B becomes smaller than the temperature of the fixing belt 20 facing another area, which causes temperature unevenness in the arrangement direction of the fixing belt 20 as illustrated in FIG. 13(*b*). Similarly, the temperature of the heater 22 corresponding to the separation area B becomes smaller than the temperature of the heater 22 corresponding to another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 34 (a). The connection portion 311 is defined as a portion of the resistive heat generator 31 that extends in the direction intersecting the arrangement direction and is connected to one of the power supply lines 33A and 33B. Similar to the separation area B, the temperature of the heater 22 corresponding to the enlarged separation area C and the temperature of the fixing belt 20 corresponding to the enlarged separation area C are smaller than the temperatures of the heater 22 and the fixing belt 20 corresponding to another area of the heat generation portion 35.

Figure 14:
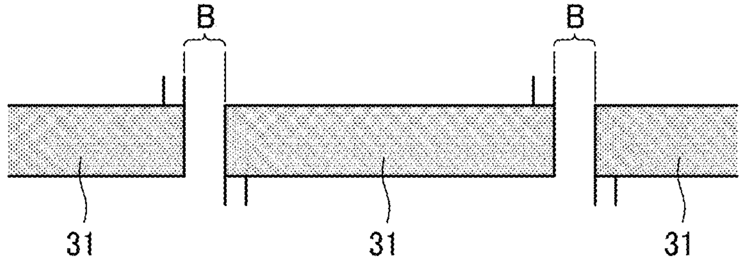
FIG. 14 is a diagram illustrating separation areas of the heater of FIG. 5.
Figure 15:
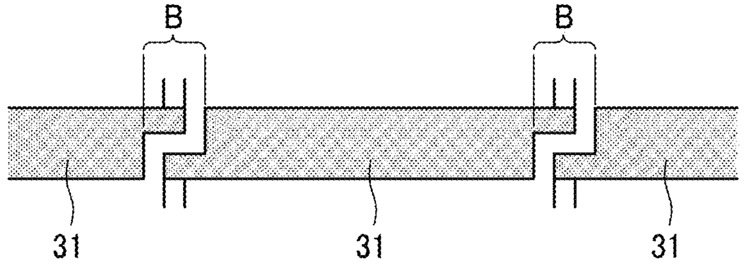
FIG. 15 is a diagram illustrating separation areas each having a form different from the form of the separation area of FIG. 14.
Figure 16:
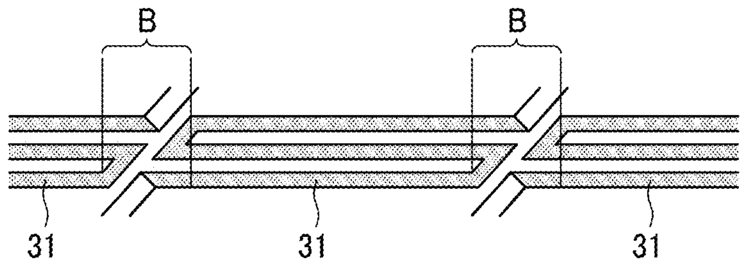
FIG. 16 is a diagram illustrating separation areas of the heater of FIG. 6.

As illustrated in FIG. 14, the heater 22 including the rectangular resistive heat generators 31 illustrated in FIG. 4 also has the separation areas B having lower temperatures than another area of the heat generation portion 35. In addition, the heater 22 including the resistive heat generators 31 having forms as illustrated in FIG. 15 has the separation areas B with lower temperatures than another area of the heat generation portion 35. As illustrated in FIG. 16, the heater 22 including the resistive heat generators 31 having forms as illustrated in FIG. 5 has the separation areas B with lower temperatures than another area of the heat generation portion 35. However, overlapping the resistive heat generators 31 lying next to each other in the arrangement direction as illustrated in FIGS. 13, 15, and 16 can reduce the above-described temperature drop that the temperature of the fixing belt 20 corresponding to the separation area B is smaller than the temperature of the fixing belt 20 corresponding to an area other than the separation area B.

The fixing device 9 in the present embodiment includes the first thermal equalization plate 28 described above in order to reduce the temperature drop corresponding to the separation area B as described above and reduce the temperature unevenness in the arrangement direction of the fixing belt 20. A detailed description is given below of the first thermal equalization plate 28.

As illustrated in FIG. 2, the first thermal equalization plate 28 is disposed between the heater 22 and the stay 24 in the lateral direction of FIG. 2 and is particularly sandwiched between the heater 22 and the heater holder 23. One side of the first thermal equalization plate 28 is brought into contact with the back face of the base 30, and the other side of the first thermal equalization plate 28 is brought into contact with the heater holder 23.

The stay 24 has two rectangular portions 24*a* extending in a thickness direction of the heater 22 and each having a contact surface 24*a*1 in contact with the back side of the heater holder 23 to support the heater holder 23, the first thermal equalization plate 28, and the heater 22. In the direction intersecting the arrangement direction that is the vertical direction in FIG. 2, the contact surfaces are outside the resistive heat generators 31. The above-described structure reduces heat transfer from the heater 22 to the stay 24 and enables the heater 22 to effectively heat the fixing belt 20.

Figure 17:
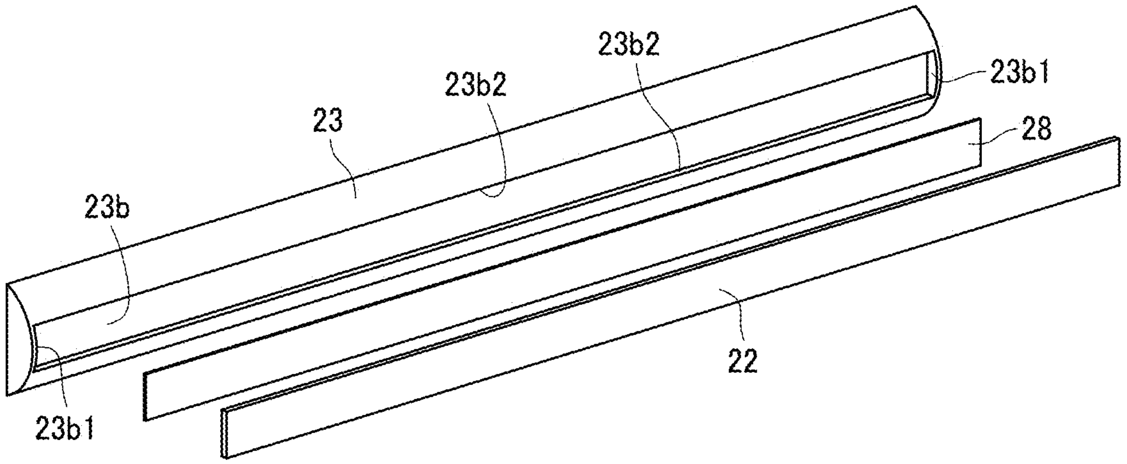
FIG. 17 is a perspective view of a heater, a first thermal equalization plate, and a heater holder.

As illustrated in FIG. 17, the first thermal equalization plate 28 is a plate having a thickness of 0.3 mm, a length of 222 mm in the arrangement direction, and a width of 10 mm in the direction intersecting the arrangement direction. In the present embodiment, the first thermal equalization plate 28 is made of a single plate but may be made of a plurality of members. In FIG. 17, the guide ribs 26 illustrated in FIG. 2 are omitted.

The first thermal equalization plate 28 is fitted into the holding recess 23*b* of the heater holder 23, and the heater 22 is mounted thereon. Thus, the first thermal equalization plate 28 is sandwiched and held between the heater holder 23 and the heater 22. Both side walls 23*b*1 forming the holding recess 23*b* in the arrangement direction restrict movement of the heater 22 and movement of the first thermal equalization plate 28 in the arrangement direction and work as regulators regulating movement in the arrangement direction. Reducing the positional deviation of the first thermal equalization plate 28 in the arrangement direction in the fixing device 9 enhances the thermal conductivity efficiency with respect to a target range in the arrangement direction. In addition, both side walls 23*b*2 forming the holding recess 23*b* in the direction intersecting the arrangement direction restricts movement of the heater 22 and movement of the first thermal equalization plate 28 in the direction intersecting the arrangement direction and work as regulators regulating movement in the direction intersecting the arrangement direction.

Figure 18:
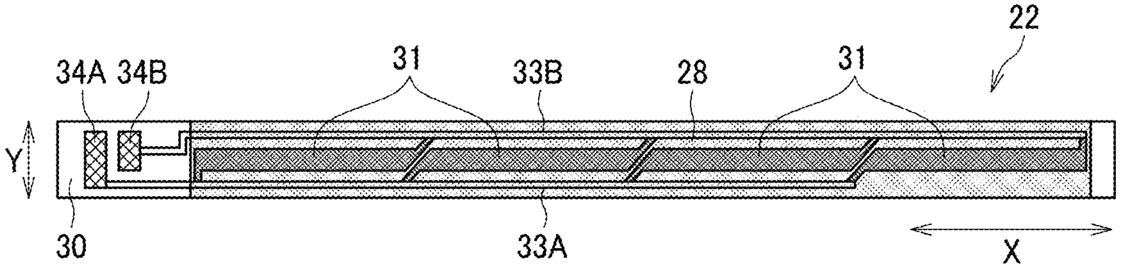
FIG. 18 is a plan view of a heater to illustrate a setting of the first thermal equalization plate.

The range in which the first thermal equalization plate 28 is disposed in the arrangement direction is not limited to the above. For example, as illustrated in FIG. 18, the first thermal equalization plate 28 may be disposed so as to face a range corresponding to the heat generation portion 35 in the arrangement direction (see a hatched portion in FIG. 18).

Due to the pressing force of the pressure roller 21, the first thermal equalization plate 28 is sandwiched between the heater 22 and the heater holder 23 and is brought into close contact with the heater 22 and the heater holder 23. Bringing the first thermal equalization plate 28 into contact with the heater 22 enhances the heat conduction efficiency in the arrangement direction of the heater 22. The first thermal equalization plate 28 facing the separation area B enhances the heat conduction efficiency of a part of the heater 22 facing the separation area B in the arrangement direction, transmits heat to the part of the heater 22 facing the separation area B, and raise the temperature of the part of the heater 22 facing the separation area B. As a result, the first thermal equalization plate 28 reduces the temperature unevenness in the arrangement direction of the heaters 22. Thus, temperature unevenness in the arrangement direction of the fixing belt 20 is reduced. As a result, the above-described structure prevents fixing unevenness and gloss unevenness in the image fixed on the sheet. Since the heater 22 does not need to generate additional heat to achieve sufficient fixing performance in the part of the heater 22 facing the separation area B, energy consumption of the fixing device 9 can be saved. The first thermal equalization plate 28 disposed over the entire area of the heat generation portion 35 in the arrangement direction enhances the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

In the present embodiment, the combination of the first thermal equalization plate 28 and the resistive heat generator 31 having the PTC characteristic described above efficiently prevents overheating the non-sheet passing region (that is the region of the fixing belt that is not in contact with the small sheet) of the fixing belt 20 when small sheets pass through the fixing device 9. Specifically, the PTC characteristic reduces the amount of heat generated by the resistive heat generator 31 facing the non-sheet passing region, and the first thermal equalization plate effectively transfers heat from the non-sheet passing region in which the temperature rises to a sheet passing region that is a region of the fixing belt contacting the sheet. As a result, the overheating of the non-sheet passing region is effectively prevented.

The first thermal equalization plate 28 may be disposed opposite an area around the separation area B because the small heat generation amount in the separation area B decreases the temperature in the area around the separation area B. For example, the first thermal equalization plate 28 facing the enlarged separation area C (see FIG. 13(*a*)) particularly enhances the heat transfer efficiency of the separation area B and the area around the separation area B in the arrangement direction and reduces the temperature unevenness of the heater 22 in the arrangement direction. In particular, the first thermal equalization plate 28 facing the entire region of the heat generation portion 35 in the arrangement direction reduces the temperature unevenness of the heater 22 (and the fixing belt 20) in the arrangement direction.

Other embodiments of the fixing device are described below.

Figure 19:
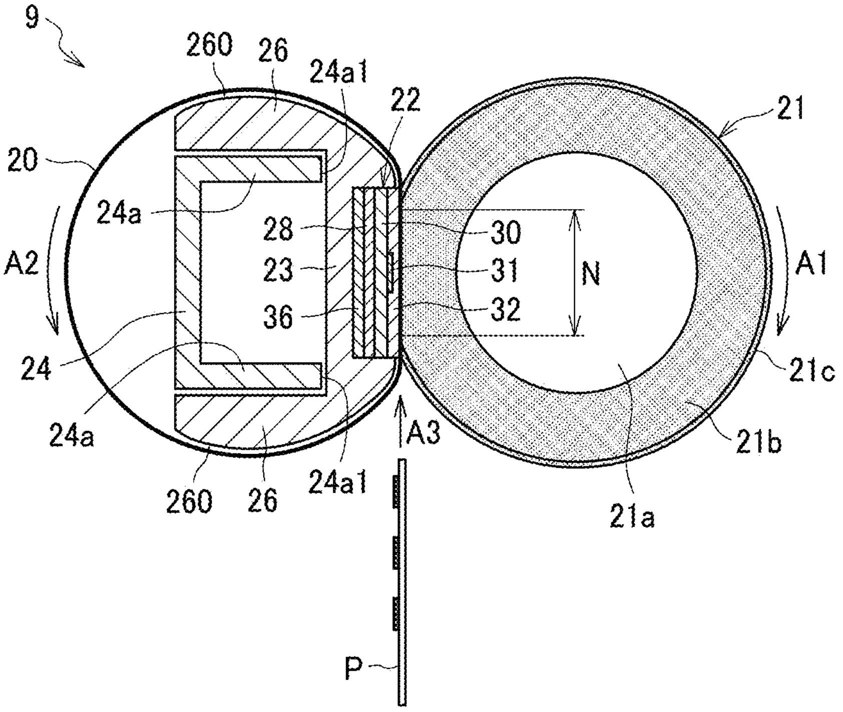
FIG. 19 is a schematic cross-sectional side view of the fixing device according to an embodiment different from the embodiment illustrated in FIG. 2.

As illustrated in FIG. 19, the fixing device 9 according to the present embodiment includes a second thermal equalization plate 36 as a second high thermal conductor between the heater holder 23 and the first thermal equalization plate 28. The second thermal equalization plate 36 is disposed at a position different from the position of the first thermal equalization plate 28 in the lateral direction in FIG. 19 that is a direction in which the heater holder 23, the stay 24, and the first thermal equalization plate 28 are layered. Specifically, the second thermal equalization plate 36 is disposed so as to overlap the first thermal equalization plate 28. FIG. 19 illustrates a schematic cross section of the fixing device 9 taken along the direction orthogonal to the arrangement direction at a position at which the thermistor 25 is not disposed, which is different from FIG. 2. In other words, FIG. 19 illustrates the schematic cross section including the second thermal equalization plate 36.

The second thermal equalization plate 36 is made of a material having thermal conductivity higher than the thermal conductivity of the base 30, for example, graphene or graphite. In the present embodiment, the second thermal equalization plate 36 is made of a graphite sheet having a thickness of 1 mm. Alternatively, the second thermal equalization plate 36 may be a plate made of aluminum, copper, silver, or the like.

Figure 20:
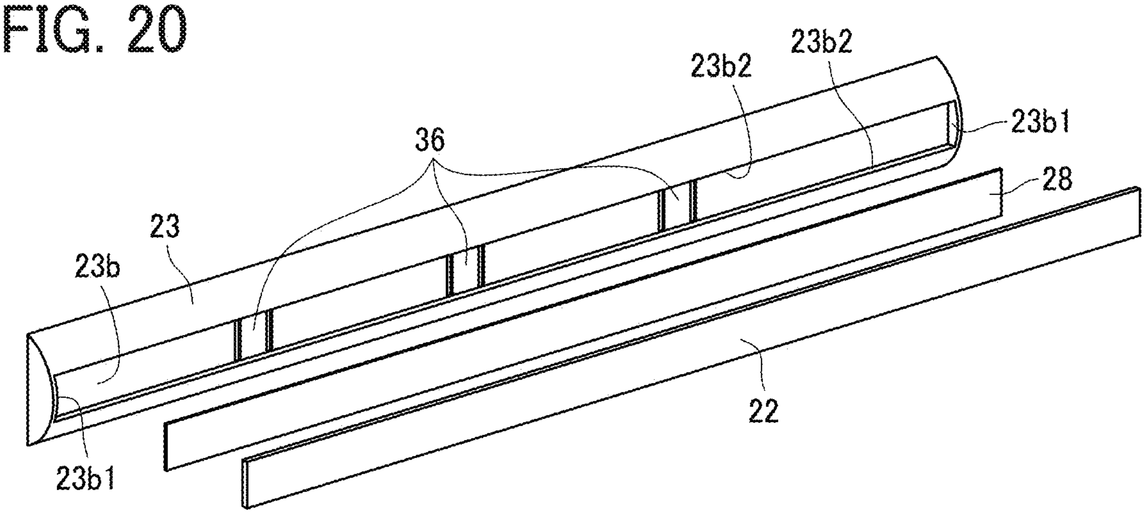
FIG. 20 is a perspective view of the heater, the first thermal equalization plate, a second thermal equalization plate, and the heater holder.

As illustrated in FIG. 20, a plurality of the second thermal equalization plates 36 are disposed on a plurality of portions of the heater holder 23 in the arrangement direction. The holding recess 23*b* of the heater holder 23 has a plurality of holes in which the second thermal equalization plates 36 are disposed. Clearances are formed between the heater holder 23 and both sides of the second thermal equalization plate 36 in the arrangement direction. The clearance prevents heat transfer from the second thermal equalization plate 36 to the heater holder 23, and the heater 22 can efficiently heat the fixing belt 20. In FIG. 20, the guide ribs 26 illustrated in FIG. 2 are omitted.

Figure 21:
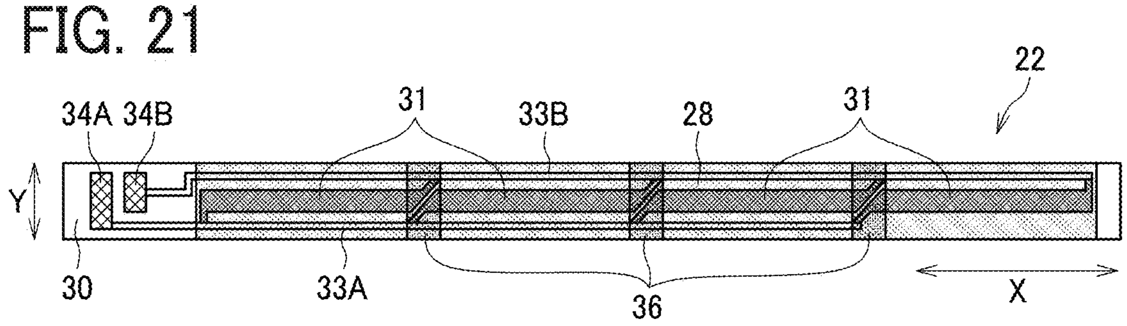
FIG. 21 is a plan view of the heater to illustrate an arrangement of the first thermal equalization plate and the second thermal equalization plates.

As illustrated in FIG. 21, each of the second thermal equalization plates 36 (see the hatched portions) is disposed at a position corresponding to the separation area B in the arrangement direction and faces at least a part of each of the neighboring resistive heat generators 31 in the arrangement direction. In particular, each of the second thermal equalization plates 36 in the present embodiment faces the entire separation area B. In the longitudinal direction, the second thermal equalization plate 36 is disposed at a position at which the thermistor or the thermostat is not disposed.

In one embodiment different from the embodiments described above, each of the first thermal equalization plate 28 and the second thermal equalization plate 36 is made of a graphene sheet. The first thermal equalization plate 28 and the second thermal equalization plate 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 22:
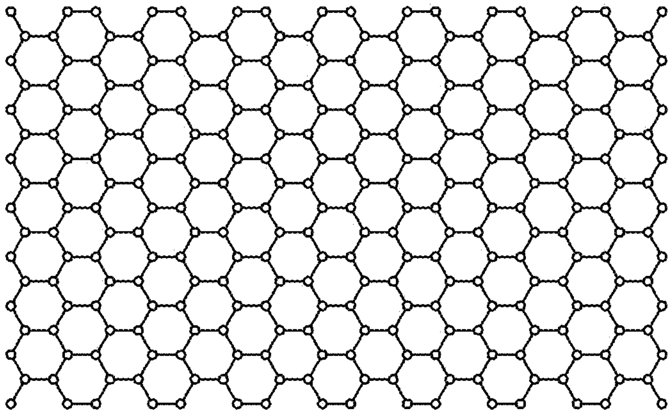
FIG. 22 is a schematic diagram illustrating a two-dimensional atomic crystal structure of graphene.

Graphene is a flaky powder. Graphene has a planar hexagonal lattice structure of carbon atoms, as illustrated in FIG. 22. The graphene sheet is typically a single layer. The single layer of carbon may contain impurities. The graphene may have a fullerene structure. The fullerene structures are typically recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 23:
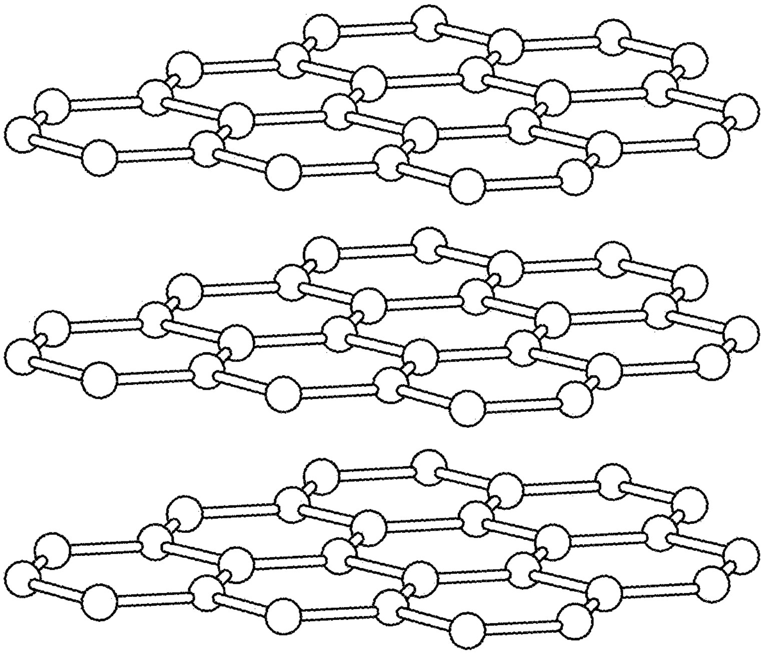
FIG. 23 is a schematic diagram illustrating a three-dimensional atomic crystal structure of graphite.

Graphite obtained by multilayering graphene has a large thermal conduction anisotropy. As illustrated in FIG. 23, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first thermal equalization plate 28 and the second thermal equalization plate 36 that are made of graphite each have the heat transfer efficiency in the arrangement direction greater than the heat transfer efficiency in the thickness direction of the first thermal equalization plate 28 and the second thermal equalization plate 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first thermal equalization plate 28 and the second thermal equalization plate 36 that are made of graphite are not oxidized at about 700 degrees or lower, the first thermal equalization plate 28 and the second thermal equalization plate 36 each have an excellent heat resistance.

The physical properties and dimensions of the graphite sheet may be appropriately changed according to the function required for the first thermal equalization plate 28 or the second thermal equalization plate 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first thermal equalization plate 28 or a width of the second thermal equalization plate 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

Figure 24:
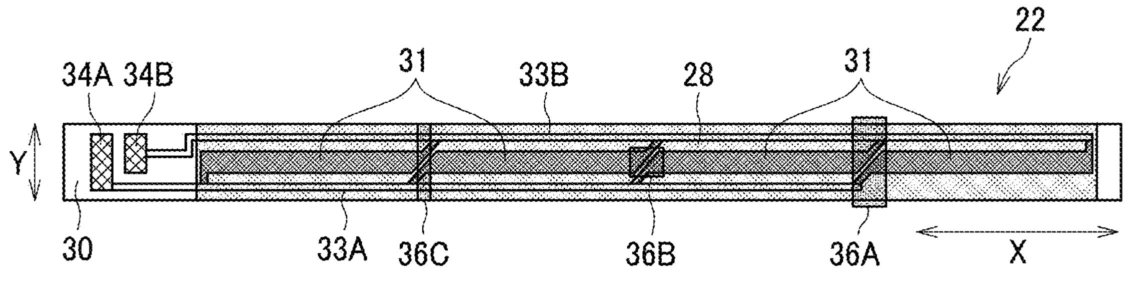
FIG. 24 is a plan view of the heater having a different arrangement of the second thermal equalization plate from the arrangement in FIG. 21.

As long as the second thermal equalization plate 36 faces a part of each of neighboring resistive heat generators 31 and at least a part of the gap area between the neighboring resistive heat generators 31, the configuration of the second thermal equalization plate 36 is not limited to the configuration illustrated in FIG. 21. For example, as illustrated in FIG. 24, a second thermal equalization plate 36A is longer than the base 30 in the direction intersecting the arrangement direction, and both ends of the second thermal equalization plate 36A in the direction intersecting the arrangement direction are outside the base 30 in FIG. 24. A second thermal equalization plate 36B faces a range in which the resistive heat generator 31 is disposed in the direction intersecting the arrangement direction. A second thermal equalization plate 36C faces a part of the gap area and a part of each of neighboring resistive heat generators 31.

Figure 25:
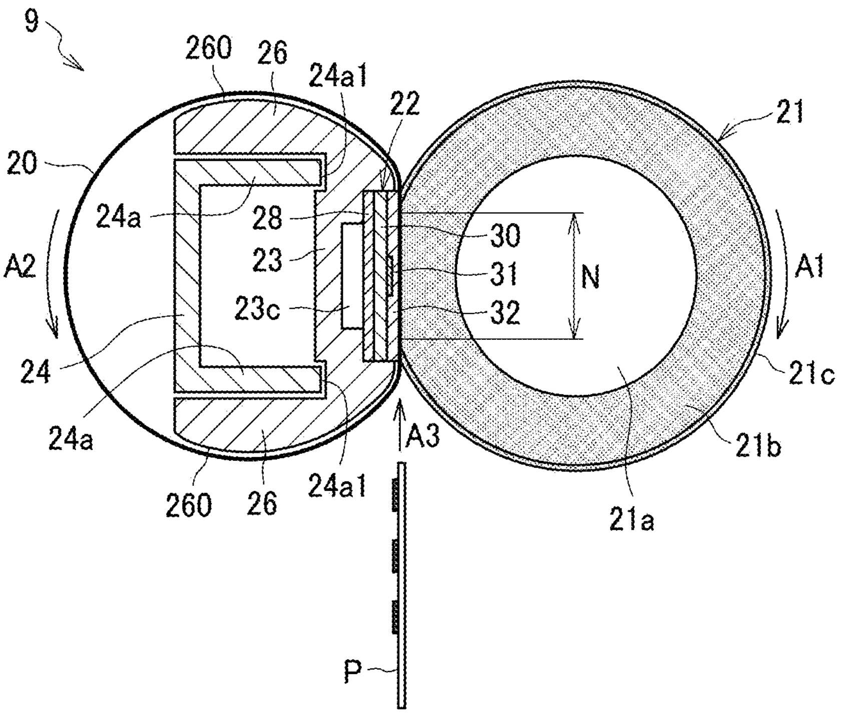
FIG. 25 is a schematic cross-sectional side view of a fixing device different from the fixing devices illustrated in FIGS. 2 and 19.

As illustrated in FIG. 25, the fixing device according to the present embodiment has a gap between the first thermal equalization plate 28 and the heater holder 23 in the thickness direction that is the lateral direction in FIG. 25. In other words, the fixing device 9 has a gap 23*c* serving as a thermal insulation layer. The gap 23*c* is in a partial area of the holding recess 23*b* (see FIG. 20). In the holding recess 23*b* of the heater holder 23, the heater 22, the first thermal equalization plate 28, and the second thermal equalization plate 36 are set, but the second thermal equalization plate is not set in the partial area. The partial area is a part of or entire area of the holding recess 23*b* other than an area on which the second thermal equalization plate 36 is set in the arrangement direction and a part of the holding recess 23*b* in the direction intersecting the arrangement direction. The gap 23*c* has a depth deeper than other portions to receive the first thermal equalization plate 28. The above-described structure minimizes the contact area between the heater holder 23 and the first thermal equalization plate 28. Minimizing the contact area reduces heat transfer from the first thermal equalization plate 28 to the heater holder 23 and enables the heater 22 to efficiently heat the fixing belt 20. In the cross section of the fixing device 9 in which the second thermal equalization plate 36 is set, the second thermal equalization plate 36 is in contact with the heater holder 23 as illustrated in FIG. 19 of the above-described embodiment.

In particular, the fixing device 9 according to the present embodiment has the gap 23*c* facing the entire area of the resistive heat generators 31 in the direction intersecting the arrangement direction that is the vertical direction in FIG. 25. The gap 23*c* reduces heat transfer from the first thermal equalization plate 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second thermal equalization plate 36 is a member different from the first thermal equalization plate 28, but the present embodiment is not limited to this. For example, the first thermal equalization plate 28 may have a thicker portion than the other portion so that the thicker portion faces the separation area B.

In the embodiments of FIGS. 19 and 25, the lengths of the main heat generation region D, the first thermal equalization plate 28, and the base 30 of the heater 22 can be set as in the above-described embodiments. Adjusting the lengths of the main heat generation region D, the first thermal equalization plate 28, and the base 30 in the above-described embodiments can reduce the temperature unevenness in the longitudinal direction of the fixing belt 20 at a low cost.

The above-described embodiments are illustrative and do not limit this disclosure. It is therefore to be understood that within the scope of the appended claims, numerous additional modifications and variations are possible to this disclosure otherwise than as specifically described herein.

Figure 26:
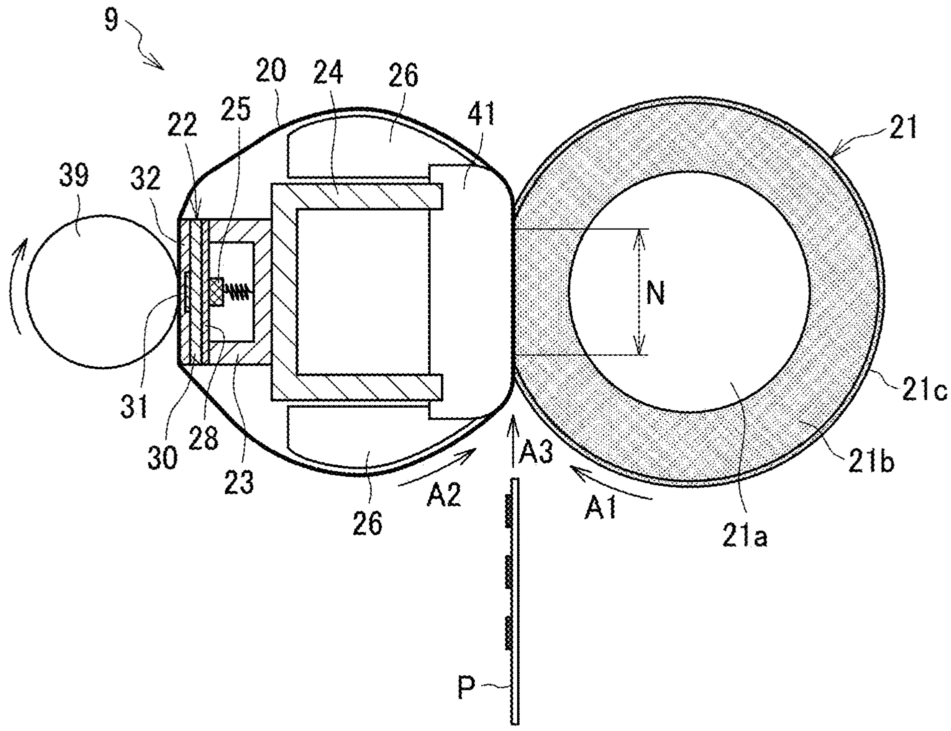
FIG. 26 is a schematic cross-sectional side view of a fixing device different from the fixing devices illustrated above.
Figure 27:
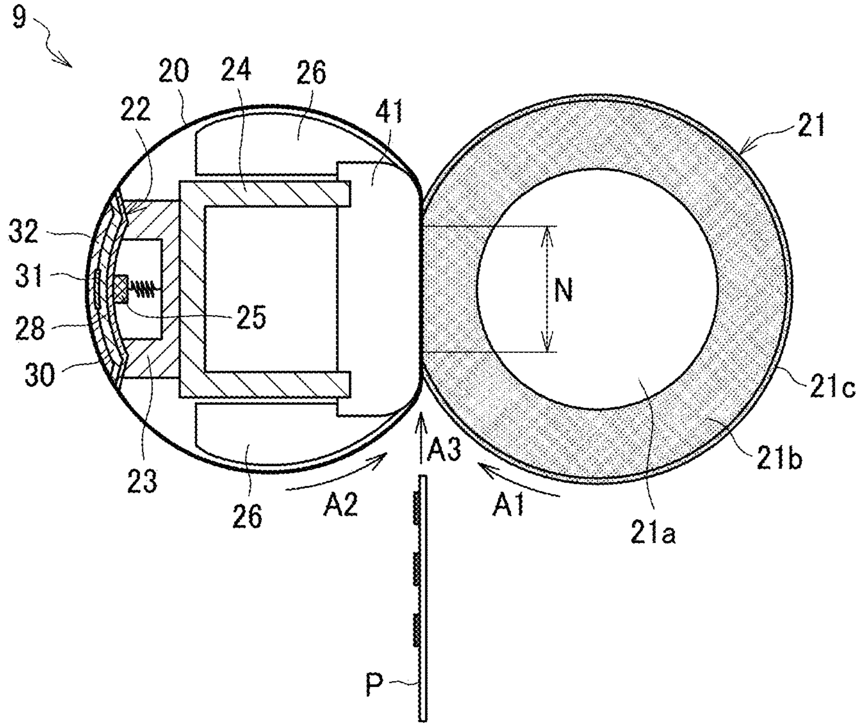
FIG. 27 is a schematic cross-sectional side view of a fixing device different from the fixing devices illustrated above.
Figure 28:
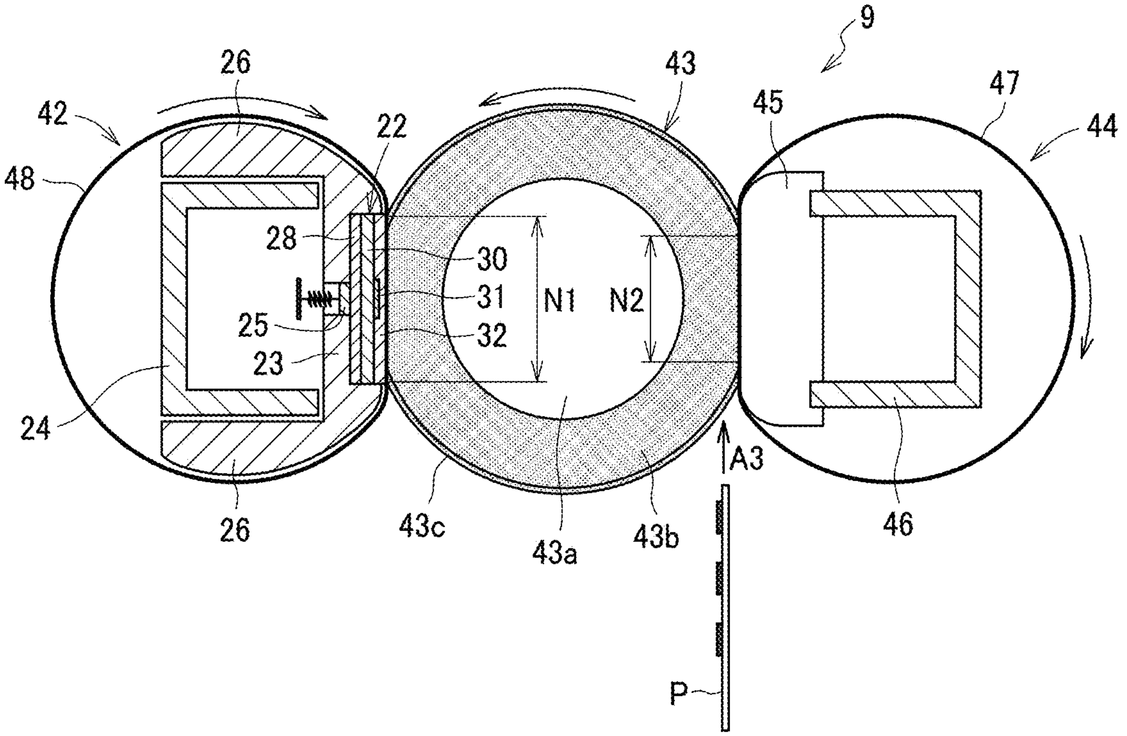
FIG. 28 is a schematic cross-sectional side view of a fixing device different from the fixing devices illustrated above.

The embodiments of the present disclosure are also applicable to the fixing devices as illustrated in FIGS. 26 to 28 in addition to the fixing devices described above. The configurations of fixing devices illustrated in FIGS. 26 to 28 are briefly described below.

The fixing device 9 illustrated in FIG. 26 includes a pressurization roller 39 opposite the pressure roller 21 with respect to the fixing belt 20. The pressurization roller 39 is an opposed rotator that rotates and is opposite the fixing belt 20 as the rotator. The fixing belt 20 is sandwiched by the pressurization roller 39 and the heater 22 and heated by the heater 22. On the other hand, a nip formation pad 41 is disposed inside the loop formed by the fixing belt 20 and disposed opposite the pressure roller 21. The nip formation pad 41 is supported by the stay 24. The nip formation pad 41 sandwiches the fixing belt 20 together with the pressure roller 21, thereby forming the fixing nip N.

A description is provided of the construction of the fixing device 9 as illustrated in FIG. 27. The fixing device 9 does not include the pressurization roller 39 described above with reference to FIG. 26. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 27 are the same as the fixing device 9 illustrated in FIG. 26.

Finally, the fixing device 9 illustrated in FIG. 28 is described. The fixing device 9 includes a heating assembly 42, a fixing roller 43 that is a fixing member, and a pressure assembly 44 that is a facing member. The heating assembly 42 includes the heater 22, the first thermal equalization plate 28, the heater holder 23, the stay 24, and a heating belt 48 as an example of a rotator, as described in the above-described embodiments. The fixing roller 43 is an opposed rotator that rotates and faces the heating belt 48 as the rotator. The fixing roller 43 includes a core 43*a*, an elastic layer 43*b*, and a release layer 43*c*. The core 43*a* is a solid core made of iron. The elastic layer 43*b* coats the circumferential surface of the core 43*a*. The release layer 43*c* coats an outer circumferential surface of the elastic layer 43*b*. The pressure assembly 44 is opposite to the heating assembly 42 with respect to the fixing roller 43. The pressure assembly 44 includes a nip formation pad 45 and a stay 46 inside the loop of a pressure belt 47, and the pressure belt 47 is rotatably arranged to wrap around the nip formation pad 45 and the stay 46. The sheet P passes through the fixing nip N2 between the pressure belt 47 and the fixing roller 43 to be heated and pressed to fix the image onto the sheet P.

In the fixing devices of FIGS. 26 to 28, the lengths of the main heat generation region D, the first thermal equalization plate 28, and the base 30 of the heater 22 can be set as in the above-described embodiments. Adjusting the lengths of the main heat generation region D, the first thermal equalization plate 28, and the base 30 in the above-described embodiments can reduce the temperature unevenness in the longitudinal direction of the fixing belt 20 or the heating belt 48 at a low cost.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

Figure 29:
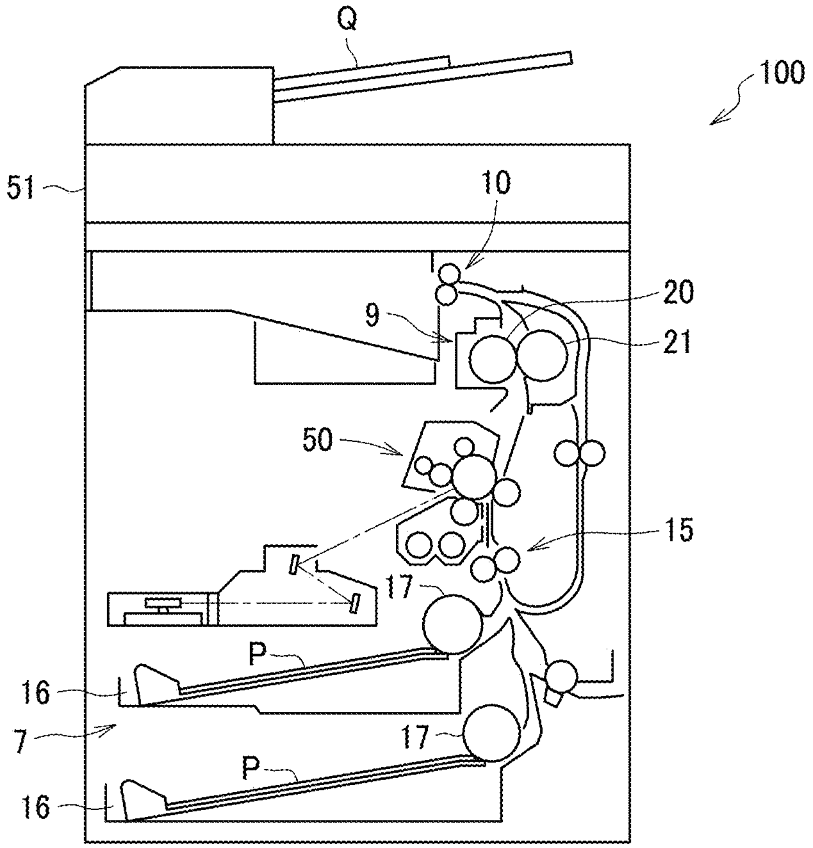
FIG. 29 is a schematic diagram of a configuration of an image forming apparatus different from the image forming apparatus of FIG. 1.

For example, as illustrated in FIG. 29, the image forming apparatus 100 according to the present embodiment includes an image forming device 50 including a photoconductor drum, the sheet conveyer including the timing roller pair 15, the sheet feeder 7, the fixing device 9, the sheet ejection device 10, and a reading device 51. The sheet feeder 7 includes multiple sheet trays 16 and sheet feed rollers 17, and the sheet trays 16 store sheets of different sizes.

The reading device 51 reads an image of a document Q. The reading device 51 generates image data from the read image. The sheet feeder 7 stores the multiple sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q.

The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

A description is given below of the fixing device 9 according to an embodiment of the present disclosure. Descriptions of the configurations common to the fixing devices of the above-described embodiments may be omitted as appropriate.

Figure 30:
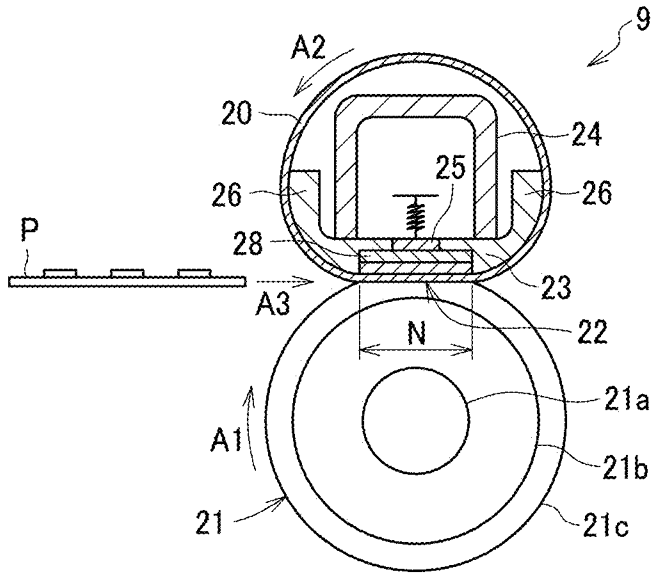
FIG. 30 is a schematic cross-sectional side view of a fixing device according to an embodiment of the present disclosure.

As illustrated in FIG. 30, the fixing device 9 includes the fixing belt 20, the pressure roller 21, the heater 22, the heater holder 23, the stay 24, the thermistor 25, and the first thermal equalization plate 28.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the release layer 21*c*. The pressure roller 21 has an outer diameter of 24 to 30 mm, and the elastic layer 21*b* has a thickness of 3 to 4 mm.

The heater 22 includes the base, a thermal insulation layer, a conductor layer including the resistive heat generator, and the insulation layer and is formed to have a thickness of 1 mm as a whole. A width Y of the heater 22 in the direction intersecting the arrangement direction is 13 mm.

Figure 31:
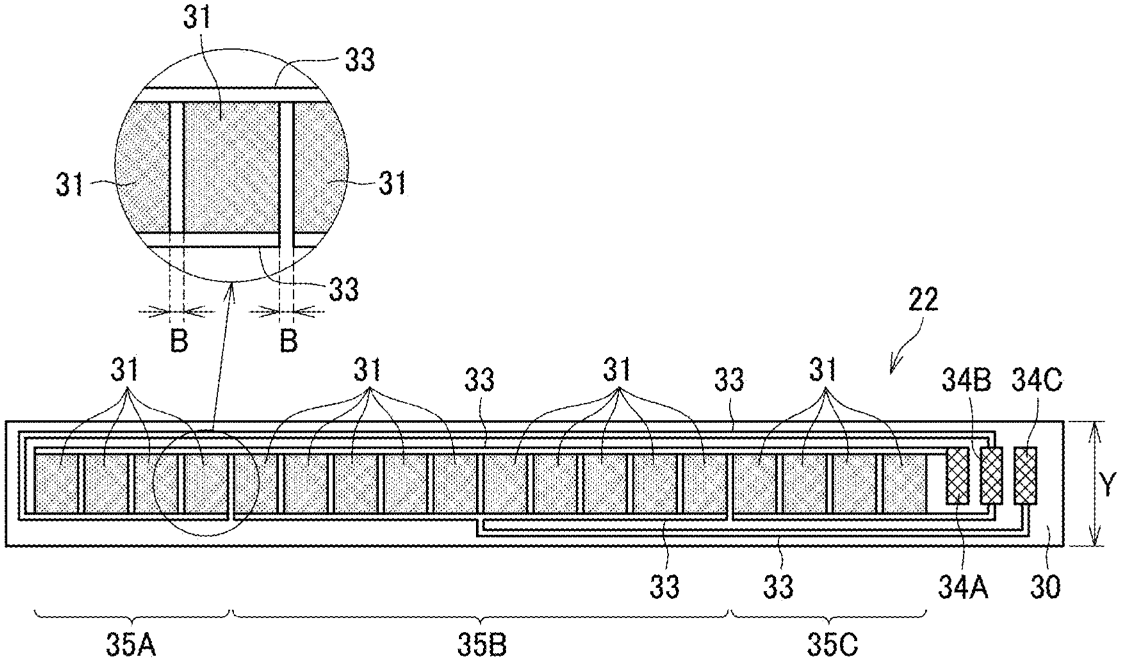
FIG. 31 is a plan view of a heater in the fixing device of FIG. 30.

As illustrated in FIG. 31, the conductor layer of the heater 22 includes the multiple resistive heat generators 31, power supply lines 33, and electrodes 34A to 34C. As illustrated in the enlarged view of FIG. 31, the separation area B is formed between neighboring resistive heat generators of the plurality of resistive heat generators 31 arranged in the arrangement direction. The enlarged view of FIG. 31 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 32:
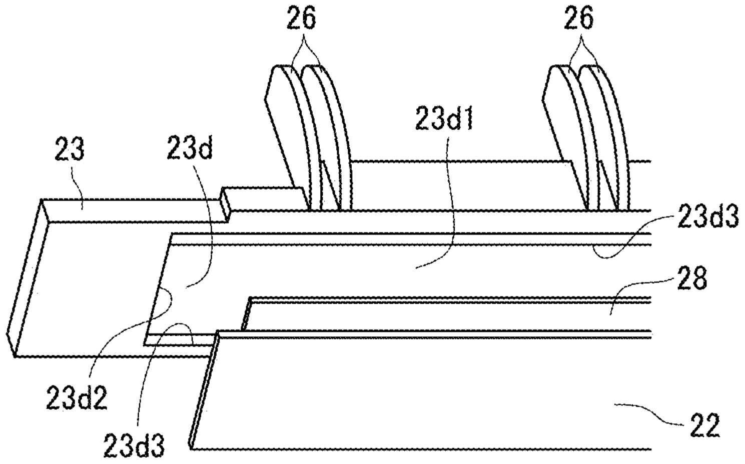
FIG. 32 is a partial perspective view of the heater and the heater holder in the fixing device of FIG. 31.

As illustrated in FIG. 32, the heater holder 23 holds the heater 22 and the first thermal equalization plate 28 in a recessed portion 23*d* of the heater holder 23. The recessed portion 23*d* is formed on the side of the heater holder 23 facing the heater 22. The recessed portion 23*d* has a bottom face 23*d*1 and walls 23*d*2 and 23*d*3. The bottom face 23*d*1 is substantially parallel to the base 30 and the face recessed from the side of the heater holder 23 toward the stay 24. The walls 23*d*2 are both side faces of the recessed portion 23*d* in the arrangement direction. The recessed portion 23*d* may have one wall 23*d*2. The walls 23*d*3 are both side faces of the recessed portion 23*d* in the direction intersecting the arrangement direction. The heater holder 23 has the guide ribs 26. The heater holder 23 is made of LCP.

Figure 33:
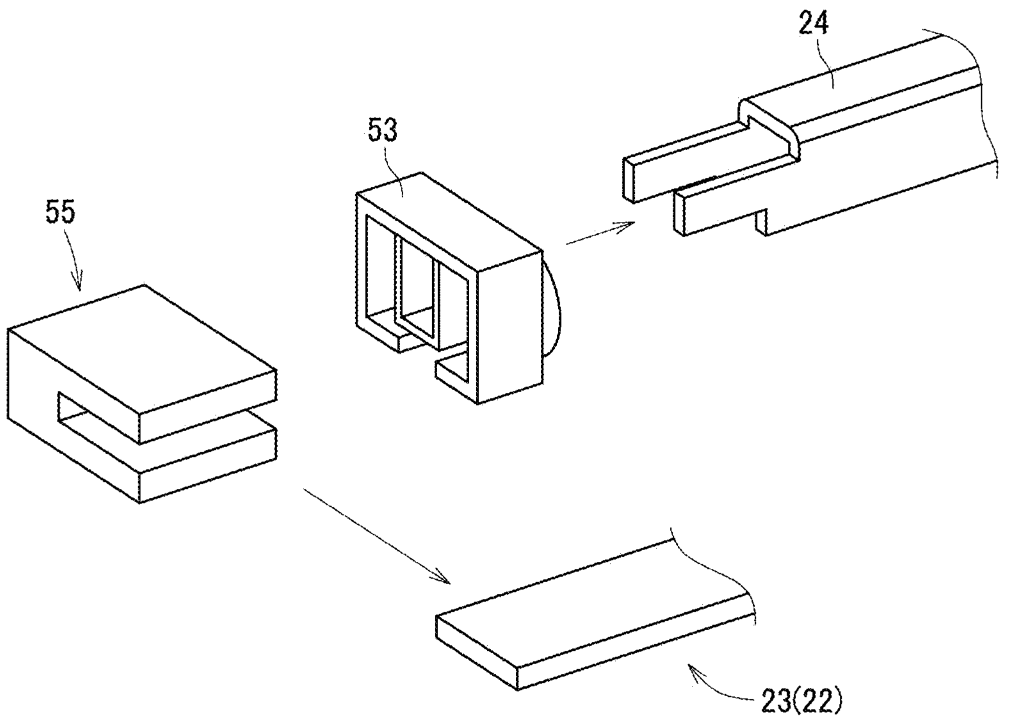
FIG. 33 is a view to illustrate a method of attaching a connector to the heater and a method of attaching a flange to a stay.

As illustrated in FIG. 33, a connector 55 includes a housing made of resin such as LCP and a plurality of contact terminals fixed to the housing.

The connector 55 is attached to the heater 22 and the heater holder 23 such that a front side of the heater 22 and the heater holder 23 and a back side of the heater 22 and the heater holder 23 are sandwiched by the connector 55. In this state, the contact terminals contact and press against the electrodes of the heater 22, respectively and the heat generation portions 35 are electrically coupled to the power supply provided for the image forming apparatus via the connector 55. The above-described configuration enables the power supply to supply power to the heat generation portions 35. Note that at least part of each of the electrodes 34 is not coated by the insulation layer and therefore exposed to give connection with the connector 55.

A flange 53 contacts the inner circumferential surface of the fixing belt 20 at each of both ends of the fixing belt 20 in the arrangement direction to hold the fixing belt 20. The flange 53 is fixed to the housing of the fixing device 9. The flange 53 is inserted into each of both ends of the stay 24 (see an arrow direction from the flange 53 in FIG. 33).

To attach to the heater 22 and the heater holder 23, the connector 55 is moved in the direction intersecting the arrangement direction (see a direction indicated by arrow from the connector 55 in FIG. 33). The connector 55 and the heater holder 23 may have a convex portion and a recessed portion to attach the connector 55 to the heater holder 23. The convex portion disposed on one of the connector 55 and the heater holder 23 is engaged with the recessed portion disposed on the other one of the connector 55 and the heater holder 23 and relatively move in the recessed portions to attach the connector 55 to the heater holder 23. The connector 55 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 34:
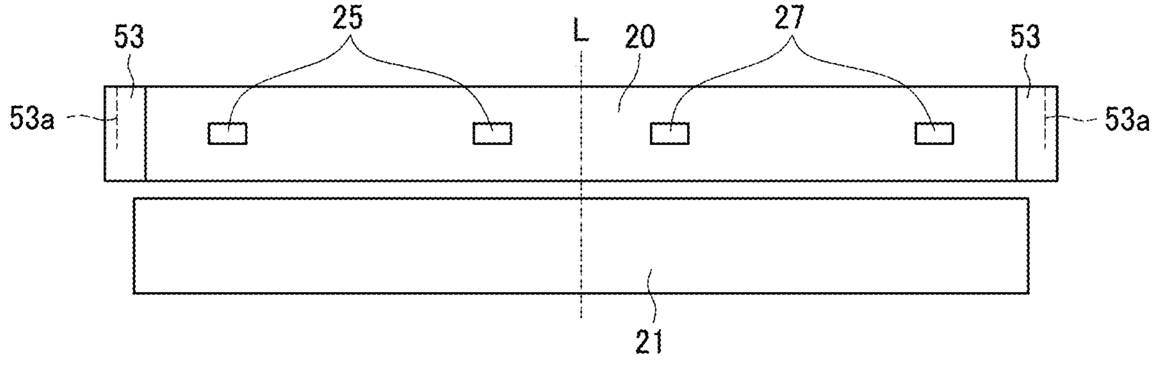
FIG. 34 is a schematic diagram illustrating an arrangement of thermistors and thermostats.

As illustrated in FIG. 34, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 34, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current to the heater 22 in response to a detection of a temperature of the fixing belt 20 higher than a predetermined threshold value.

The flanges 53 are disposed at both ends of the fixing belt 20 in the arrangement direction and hold both ends of the fixing belt 20, respectively. The flange 53 is made of LCP.

Figure 35:
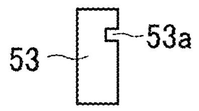
FIG. 35 is a schematic diagram illustrating a groove of a flange.

As illustrated in FIG. 35, the flange 53 has a slide groove 53*e*. The slide groove 53*e* extends in a direction in which the fixing belt 20 moves toward and away from the pressure roller 21. An engaging portion of the housing of the fixing device 9 is engaged with the slide groove 53*e*. The relative movement of the engaging portion in the slide groove 53*e* enables the fixing belt 20 to move toward and away from the pressure roller 21.

In the fixing devices 9 described above, the lengths of the main heat generation region D, the first thermal equalization plate 28, and the base 30 of the heater 22 can be set as in the above-described embodiments. Adjusting the lengths of the main heat generation region D, the first thermal equalization plate 28, and the base 30 in the above-described embodiments can reduce the temperature unevenness in the longitudinal direction of the fixing belt 20 at a low cost.

The heating device is not limited to the fixing devices described in the above embodiments. The present disclosure may be applied to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating device can reduce the temperature unevenness in the longitudinal direction of the rotator at a low cost.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

The sheet is one example of a recording medium. The recording medium may be a sheet of plain paper, thick paper, thin paper, a postcard, an envelope, coated paper, art paper, tracing paper, overhead projector (OHP) sheet, plastic film, prepreg, copper foil, or the like.

Aspects of the present disclosure are, for example, as follows.

First Aspect

In a first aspect, a heating device includes a rotator, a heater, and a thermal conductor. The heater extends in a longitudinal direction to heat the rotator. The heater includes a base and a resistive heat generator. The base extends from one end to another end in the longitudinal direction. The resistive heat generator on the base forms a main heat generation region extending from one end to another end in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. The base has a first base portion and a second base portion. The first base portion protrudes from the one end of the main heat generation region to the one end of the base by a first protrusion amount (L5L). The second base portion protrudes from said another end of the main heat generation region to said another end of the base by a second protrusion amount larger than the first protrusion amount of the first base portion. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

$$0 \leq L3R < L3L \quad (2)$$

where

L1R (mm) is the fourth protrusion amount,

L2R is the sixth protrusion amount, $$L3R = L2R - L1R,$$

$$L3L = L2L - L1L,$$

L1L is the third protrusion amount, and

L2L is the fifth protrusion amount.

Second Aspect

In a second aspect, a heating device includes a rotator, a heater, a pressure rotator, and a thermal conductor. The heater extends in a longitudinal direction to heat the rotator. The heater includes a base and a resistive heat generator. The base extends from one end to another end in the longitudinal direction. The resistive heat generator on the base forms a main heat generation region extending from one end to another end in the longitudinal direction. The pressure rotator includes an elastic layer and presses the rotator. The elastic layer extends from one end to another end in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. The elastic layer has a first layer portion and a second layer portion. The first layer portion protrudes from the one end of the main heat generation region to the one end of the elastic layer by a seven protrusion amount. The second layer portion protrudes from said another end of the main heat generation region to said another end of the elastic layer by an eighth protrusion amount smaller than the seventh protrusion amount of the first layer portion. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

$$0 \leq L3R < L3L \quad (2)$$

where

L1R (mm) is the fourth protrusion amount,

L2R is the sixth protrusion amount, $$L3R = L2R - L1R,$$

$$L3L = L2L - L1L,$$

L1L is the third protrusion amount, and

L2L is the fifth protrusion amount.

Third Aspect

In a third aspect, a heating device includes a rotator, a heater, and a thermal conductor. The heater extends in a longitudinal direction to heat the rotator. The heater includes a base, a resistive heat generator, a first conductor, and a second conductor. The base extends from one end to another end in the longitudinal direction. The resistive heat generator on the base forms a main heat generation region extending from one end to another end in the longitudinal direction. The first conductor is adjacent to the one end of the main heat generation region. The second conductor is adjacent to said another end of the main heat generation region. The second conductor is longer than the first conductor in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

$$0 \leq L3R < L3L \quad (2)$$

where

L1R (mm) is the fourth protrusion amount,

L2R is the sixth protrusion amount, $$L3R = L2R - L1R,$$

$$L3L = L2L - L1L,$$

L1L is the third protrusion amount, and

L2L is the fifth protrusion amount.

Fourth Aspect

In a fourth aspect, a heating device includes a rotator, a heater, and a thermal conductor. The heater extends in a longitudinal direction to heat the rotator. The heater includes a base and a resistive heat generator. The base extends from one end to another end in the longitudinal direction. The resistive heat generator on the base forms a main heat generation region extending from one end to another end in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. The base has a first portion from a center of the main heat generation region to the one end of the base in the longitudinal direction and a second portion from the center of the main heat generation region to said another end of the base in the longitudinal direction. A saturation temperature of the first portion is higher than a saturation temperature of the second portion when the heater itself generates heat. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

-continued $$0 \leq L3R < L3L \quad (2)$$

where
L1R (mm) is the fourth protrusion amount,
L2R is the sixth protrusion amount, $$L3R = L2R - L1R,$$

$$L3L = L2L - L1L,$$

L1L is the third protrusion amount, and
L2L is the fifth protrusion amount.

Fifth Aspect

In a fifth aspect, a heating device includes a rotator, a heater, and a thermal conductor. The heater extends in a longitudinal direction to heat the rotator. The heater includes a base and a resistive heat generator. The base extends from one end to another end in the longitudinal direction. The resistive heat generator on the base forms a main heat generation region extending from one end to another end in the longitudinal direction. The thermal conductor has a higher thermal conductivity than the base and extends from one end to another end in the longitudinal direction. The heating device has a maximum passing region through which a maximum recording medium having the largest width of recording media used in the heating device passes, and the maximum passing region has one end and another end in the longitudinal direction. A length from a center of the maximum passing region in the longitudinal direction to the one end of the base is shorter than a length of the center of the maximum passing region to said another end of the base. The main heat generation region has a first heater portion and a second heater portion. The first heater portion protrudes from the one end of the maximum passing region to the one end of the main heat generation region by a third protrusion amount. The second heater portion protrudes from said another end of the maximum passing region to said another end of the main heat generation region by a fourth protrusion amount. The thermal conductor has a first conductor portion and a second conductor portion. The first conductor portion protrudes from the one end of the maximum passing region to the one end of the thermal conductor by a fifth protrusion amount. The second conductor portion protrudes from said another end of the maximum passing region to said another end of the thermal conductor by a sixth protrusion amount. The base, the main heat generation region, and the maximum passing region satisfy the following expressions.

$$L1R \leq L2R \leq L1R + 1 \quad (1)$$

$$0 \leq L3R < L3L \quad (2)$$

where
L1R (mm) is the fourth protrusion amount,
L2R is the sixth protrusion amount, $$L3R = L2R - L1R,$$

-continued $$L3L = L2L - L1L,$$

L1L is the third protrusion amount, and
L2L is the fifth protrusion amount.

Sixth Aspect

In a sixth aspect, the base and the maximum passing region in the heating device according to any one of the first to fifth aspects satisfy the following expressions.

$$L2L \leq L4L \quad (3)$$

$$L2R \leq L4R \quad (4)$$

where L4L is a protrusion amount (mm) from the one end of the maximum passing region to the one end of the base in the longitudinal direction, and L4R is a protrusion amount (mm) from said another end of the maximum passing region to said another end of the base in the longitudinal direction.

Seventh Aspect

In a seventh aspect, the base, the main heat generation region, and the maximum passing region in the heating device according to any one of the first to sixth aspects satisfy the following expressions.

$$0.6 \leq AL/AR \leqq 1.4 \quad (5)$$

$$AL = \lambda 1 \times V1L + \lambda 2 \times V2L.$$

$$AR = \lambda 1 \times V1R + \lambda 2 \times V2R$$

where λ1 is a thermal conductivity [W/m·K] of the base, λ2 is a thermal conductivity [W/m·K] of the thermal conductor, V1L is a volume (mm3) of the first base portion, V2L is a volume (mm3) of the thermal conductor from the one end of the main heat generation region to the one end of the thermal conductor in the longitudinal direction, V1R is a volume (mm3) of the second base portion, and V2R is a volume (mm3) of the thermal conductor from said another end of the main heat generation region to said another end of the high thermal conductor in the longitudinal direction.

Eighth Aspect

In an eighth aspect, the base, the main heat generation region, and the maximum passing region in the heating device according to the seventh aspect satisfy the following expressions.

$$0.8 \leq AL/AR \leq 1.2 \quad (6)$$

Ninth Aspect

In a ninth aspect, the high thermal conductor in the heating device according to any one of the first to eighth aspects is made of aluminum.

Tenth Aspect

In a tenth aspect, the heating device according to any one of the first to ninth aspects further includes grease interposed between the heater and the rotator.

Eleventh Aspect

In an eleventh aspect, a fixing device includes the heating device according to any one of the first to tenth aspects.

Twelfth Aspect

In a twelfth aspect, an image forming apparatus includes the fixing device according to the eleventh aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator;

a heater extending in a longitudinal direction to heat the rotator, the heater including:

a base extending from one end to another end in the longitudinal direction; and a resistive heat generator on the base, the resistive heat generator forming a main heat generation region extending from one end to another end in the longitudinal direction; and a thermal conductor having a higher thermal conductivity than the base, the thermal conductor extending from one end to another end in the longitudinal direction, wherein the heating device has a maximum passing region through which a maximum recording medium having the largest width of recording media used in the heating device passes, the maximum passing region has one end and another end in the longitudinal direction, the base has:

a first base portion protruding from the one end of the main heat generation region to the one end of the base by a first protrusion amount (L5L); and a second base portion protruding from said another end of the main heat generation region to said another end of the base by a second protrusion amount larger than the first protrusion amount of the first base portion, the main heat generation region has:

a first heater portion protruding from the one end of the maximum passing region to the one end of the main heat generation region by a third protrusion amount; and a second heater portion protruding from said another end of the maximum passing region to said another end of the main heat generation region by a fourth protrusion amount, the thermal conductor has:

a first conductor portion protruding from the one end of the maximum passing region to the one end of the thermal conductor by a fifth protrusion amount; and a second conductor portion protruding from said another end of the maximum passing region to said another end of the thermal conductor by a sixth protrusion amount, and the base, the main heat generation region, and the maximum passing region satisfy the following expressions, $$L1R \leqq L2R \leqq L1R + 1\ \text{mm} \quad (1)$$

$$0 \leqq L3R < L3L \quad (2)$$

where

L1R (mm) is the fourth protrusion amount,

L2R (mm) is the sixth protrusion amount, $$L3R = L2R - L1R,$$

$$L3L = L2L - L1L,$$

L1L is the third protrusion amount, and

L2L is the fifth protrusion amount.

2. The heating device according to claim 1, wherein the base and the maximum passing region satisfy the following expressions, $$L2L \leq L4L \quad (3)$$

$$L2R \leq L4R \quad (4)$$

where

L4L is a protrusion amount (mm) from the one end of the maximum passing region to the one end of the base in the longitudinal direction, and L4R is a protrusion amount (mm) from said another end of the maximum passing region to said another end of the base in the longitudinal direction.

3. The heating device according to claim 1, wherein the base, the main heat generation region, and the maximum passing region satisfy the following expressions, $$0.6 \leq AL/AR \leq 1.4 \quad (5)$$

$$AL = \lambda 1 \times V1L + \lambda 2 \times V2L$$

$$AR = \lambda 1 \times V1R + \lambda 2 \times V2R$$

where

λ1 is a thermal conductivity [W/m·K] of the base,

λ2 is a thermal conductivity [W/m·K] of the thermal conductor,

V1L is a volume ($mm^3$) of the first base portion,

V2L is a volume ($mm^3$) of the thermal conductor from the one end of the main heat generation region to the one end of the thermal conductor in the longitudinal direction, V1R is a volume ($mm^3$) of the second base portion, and V2R is a volume ($mm^3$) of the thermal conductor from said another end of the main heat generation region to said another end of the high thermal conductor in the longitudinal direction.

4. The heating device according to claim 3, wherein the base, the main heat generation region, and the maximum passing region satisfy the following expressions.

$$0.8 \leq AL/AR \leq 1.2. \quad (6)$$

5. The heating device according to claim 1, wherein the thermal conductor is made of aluminum.

6. The heating device according to claim 1, further comprising grease interposed between the heater and the rotator.

7. A fixing device comprising the heating device according to claim 1.

8. An image forming apparatus comprising the fixing device according to claim 7.

9. A heating device comprising:

a rotator;

a heater extending in a longitudinal direction to heat the rotator, the heater including:

a base extending from one end to another end in the longitudinal direction;

a resistive heat generator on the base, the resistive heat generator forming a main heat generation region extending from one end to another end in the longitudinal direction;

a first conductor adjacent to the one end of the main heat generation region; and a second conductor adjacent to said another end of the main heat generation region, the second conductor longer than the first conductor in the longitudinal direction; and a thermal conductor having a higher thermal conductivity than the base, the thermal conductor extending from one end to another end of the thermal conductor in the longitudinal direction, wherein the heating device has a maximum passing region through which a maximum recording medium having the largest width of recording media used in the heating device passes, the maximum passing region has one end and another end in the longitudinal direction, the main heat generation region has:

a first heater portion protruding from the one end of the maximum passing region to the one end of the main heat generation region by a third protrusion amount; and a second heater portion protruding from said another end of the maximum passing region to said another end of the main heat generation region by a fourth protrusion amount, the thermal conductor has:

a first conductor portion protruding from the one end of the maximum passing region to the one end of the thermal conductor by a fifth protrusion amount; and a second conductor portion protruding from said another end of the maximum passing region to said another end of the thermal conductor by a sixth protrusion amount, and the base, the main heat generation region, and the maximum passing region satisfy the following expressions, $$L1R \leqq L2R \leqq L1R + 1 \text{ mm} \quad (1)$$

$$0 \leqq L3R < L3L \quad (2)$$

where

L1R (mm) is the fourth protrusion amount,

L2R (mm) is the sixth protrusion amount, $$L3R = L2R - L1R,$$

$$L3L = L2L - L1L,$$

L1L is the third protrusion amount, and

L2L is the fifth protrusion amount.

10. A fixing device comprising the heating device according to claim 9.

11. An image forming apparatus comprising the fixing device according to claim 10.

12. A heating device comprising:

a rotator;

a heater extending in a longitudinal direction to heat the rotator, the heater including:

a base extending from one end to another end in the longitudinal direction; and a resistive heat generator on the base, the resistive heat generator forming a main heat generation region extending from one end to another end in the longitudinal direction; and a thermal conductor having a higher thermal conductivity than the base, the thermal conductor extending from one end to another end in the longitudinal direction, wherein the heating device has a maximum passing region through which a maximum recording medium having the largest width of recording media used in the heating device passes, the maximum passing region has one end and another end in the longitudinal direction, the base has:

a first portion from a center of the main heat generation region to the one end of the base in the longitudinal direction; and a second portion from the center of the main heat generation region to said another end of the base in the longitudinal direction, a saturation temperature of the first portion is higher than a saturation temperature of the second portion when the heater itself generates heat, the main heat generation region has:

a first heater portion protruding from the one end of the maximum passing region to the one end of the main heat generation region by a third protrusion amount; and a second heater portion protruding from said another end of the maximum passing region to said another end of the main heat generation region by a fourth protrusion amount, the thermal conductor has:

a first conductor portion protruding from the one end of the maximum passing region to the one end of the thermal conductor by a fifth protrusion amount; and a second conductor portion protruding from said another end of the maximum passing region to said another end of the thermal conductor by a sixth protrusion amount, and the base, the main heat generation region, and the maximum passing region satisfy the following expressions, $$L1R \leqq L2R \leqq L1R + 1 \text{ mm} \quad (1)$$

$$0 \leqq L3R < L3L \quad (2)$$

where

L1R (mm) is the fourth protrusion amount,

L2R (mm) is the sixth protrusion amount, $$L3R = L2R - L1R,$$

$$L3L = L2L - L1L,$$

L1L is the third protrusion amount, and
L2L is the fifth protrusion amount.

13. A fixing device comprising
the heating device according to claim 12.

14. An image forming apparatus comprising
the fixing device according to claim 13.

* * * * *